United States Patent
Anderson et al.

(10) Patent No.: US 7,478,419 B2
(45) Date of Patent: Jan. 13, 2009

(54) AUTOMATED POLICY CONSTRAINT MATCHING FOR COMPUTING RESOURCES

(75) Inventors: Anne H. Anderson, Acton, MA (US); Balasubramanian Devaraj, Singapore (SG)

(73) Assignee: Sun Microsystems, Inc., Santa Clara, CA (US)

(*) Notice: Subject to any disclaimer, the term of this patent is extended or adjusted under 35 U.S.C. 154(b) by 874 days.

(21) Appl. No.: 11/075,899

(22) Filed: Mar. 9, 2005

(65) Prior Publication Data

US 2006/0206440 A1     Sep. 14, 2006

(51) Int. Cl.
G06F 21/00 (2006.01)
G06F 15/16 (2006.01)
H04L 9/00 (2006.01)

(52) U.S. Cl. .................. 726/1; 726/4; 709/228

(58) Field of Classification Search .......... None
See application file for complete search history.

(56) References Cited

U.S. PATENT DOCUMENTS

| | | | | |
|---|---|---|---|---|
| 5,220,604 | A * | 6/1993 | Gasser et al. | 707/9 |
| 5,224,163 | A * | 6/1993 | Gasser et al. | 380/30 |
| 5,797,128 | A * | 8/1998 | Birnbaum | 707/5 |
| 6,216,231 | B1 | 4/2001 | Stubblebine | |
| 6,256,741 | B1 | 7/2001 | Stubblebine | |
| 6,601,082 | B1 * | 7/2003 | Durham et al. | 718/100 |
| 6,779,120 | B1 | 8/2004 | Valente et al. | |
| 6,816,965 | B1 | 11/2004 | Moore et al. | |
| 6,912,587 | B1 | 6/2005 | O'Neil | |
| 7,213,262 | B1 * | 5/2007 | Elley et al. | 726/10 |
| 7,290,275 | B2 * | 10/2007 | Baudoin et al. | 726/1 |
| 2003/0163726 | A1 * | 8/2003 | Kidd | 713/200 |
| 2003/0226038 | A1 * | 12/2003 | Raanan et al. | 713/201 |
| 2004/0123153 | A1 * | 6/2004 | Wright et al. | 713/201 |
| 2006/0116912 | A1 * | 6/2006 | Maes | 705/4 |
| 2006/0117014 | A1 * | 6/2006 | Qi | 707/9 |
| 2006/0120526 | A1 * | 6/2006 | Boucher et al. | 380/247 |
| 2006/0122975 | A1 * | 6/2006 | Taylor et al. | 707/3 |
| 2006/0282484 | A1 * | 12/2006 | Stakutis et al. | 707/204 |

(Continued)

OTHER PUBLICATIONS

"XACML profile for Web-services, Working draft 04, Sep. 29, 2003," OASIS, 2003, pp. 1-41.

(Continued)

*Primary Examiner*—Christopher A Revak
(74) *Attorney, Agent, or Firm*—Robert C. Kowert; Meyertons, Hood, Kivlin, Kowert & Goetzel, P.C.

(57) ABSTRACT

Web services interface policy constraints may be specified in a policy constraints language and policy processing, such as generating an intersection policy of two policies may be automated by a policy-processing engine. A policy constraint may be a specification of a value, range of values, or set of values that a particular requirement or offering is allowed to have. Hierarchies of requirements and/or offerings may also be expressed and matched such that a more specific case of a requirement or offering may be matched against a more general case of the same requirement or offering. Also, preferences among vocabulary items, vocabulary item values, policy constraints, and other elements of a policy may be specified and automatically determined by a policy-processing engine. Automated matching of consumer requirements against provider offerings may allow a policy-processing engine to process policies with specifications of requirements or offerings from any domain-specific schema.

23 Claims, 11 Drawing Sheets

U.S. PATENT DOCUMENTS

2007/0053309 A1* 3/2007 Poojary et al. ............... 370/256
2008/0201179 A1* 8/2008 Maes ........................... 705/7

OTHER PUBLICATIONS

Damianou, N., "The Ponder Policy Specification Language," Department of Computing, Imperial College, 2001, pp. 1-21.

Bellwood, T., editor "UDDI Version 2.04 API Specification, UDDI Committee Specification, Jul. 19, 2002," OASIS, Jul. 19, 2002, pp. 1-93.

Barth, A., et al., "Conflict and Combination in Privacy Policy Languages," 2004, pp. 1-2.

Bradner, S., "Key words for use in RFCs to Indicate Requirement Levels," Mar. 1997, pp. 1-3.

Christensen, E., et al., "Web Services Description Language (WSDL) 1.1," 2001, pp. 1-51, http://www.w3.org/TR/2001/Note-WSDL-20010315.

"Response to the UML 2.0 OCL RfP (ad/Sep. 3, 2000)," Revised Submission, Version 1.6, Jan. 6, 2003, pp. i-D5.

"ebXML Creating A Single Global Electronic Market, Collaboration-Protocol Profile and Agreement Specification Version 2.0," OASIS ebXML Collaboration Protocol Profile and Agreement Technical Committee, Sep. 23, 2002, pp. 1-156.

* cited by examiner

AUTOMATED POLICY CONSTRAINT MATCHING FOR COMPUTING RESOURCES

BACKGROUND OF THE INVENTION

1. Field of the Invention

This invention relates to computer implemented policies in general, and more specifically to automated matching of policy constraints.

2. Description of the Related Art

A major development in the software industry is "web services." In general, web services are services offered via the Web. Web services can be considered loosely coupled components, or other programmable application logic, that communicate using standard, platform-independent and language-independent protocols. Web services combine aspects of component-based development with Internet protocols. Like components, web services represent black-box functionality that can be used (and reused) without worrying about how the particular service is implemented. Unlike current component technologies however, web services are not normally accessed via object-model-specific protocols, such as DCOM, RMI, or IIOP. Instead, web services are generally accessed via Internet protocols and data formats, such as HTTP and XML.

Web services may be self-contained, self-describing, modular services that can be published, located, and invoked across the Internet. Web services perform functions, which can be anything from simple requests to complicated business processes. In other words, web services are interoperable building blocks for constructing applications. For example, a distributed digital library infrastructure may be built using web services to provide functionality such as distributed search, authentication, inter-library loan requests, document translation and payment. These web services could be combined by a particular digital library service to offer an environment for reaching information resources tailored to a particular user community. Where current Internet protocols enable users to connect to applications, web services enable applications to connect to other applications.

For instance, FIG. 1 is a block diagram illustrating web services consumers and providers of communicating over a network, such as the Internet, via various web services interfaces. Thus, web services consumers 110A, 110B, and 110C may communicate with web services providers 120A, 120B, and 120C via web services interfaces 130A, 130B, 130C, 130D, 130E, and 130F, respectively. For example, web services provider 120A may provide digital library services as described above and may expose those services via web services interface 140A. Web services consumer 110A may implement web services interface 130A to communicate with web services provider 120A. Thus, pairs of web services interfaces may communicate according to compatible protocols.

Additionally, Web services components may link to other web service components to provide a collaborative service. Traditional web services implementations cannot automate this linkage because they generally do not provide a means for components to express their collaboration and communication requirements and offerings in a form amenable to automated processing; nor do they provide a means of matching requirements of one component against the offerings of other components. Examples of requirements and offerings are whether encryption is required, and if so, which encryption algorithm to use and with what parameters; whether "reliable messaging" must be used, and if so, how long between transmission retries, etc. Other requirements may include role membership certificates a consumer must provide, and correspondingly, role membership certificates that the consumer is willing or able to provide; what type of authentication must be used; a minimum price a provider is willing to accept for a service, and a maximum price a consumer is willing to pay for a service.

In a typical Web services scenario, a business application sends a request to a service at a given URL using the Simple Object Access Protocol (SOAP) over HTTP. SOAP is a standard for XML-based information exchange between distributed applications. Although other transports are possible, SOAP is typically transmitted over HTTP providing a platform for communication with or between, web services. The service receives the request, processes it, and returns a response. An example of a web service is a stock quote service, in which a request asks for the current price of a specified stock, and a response provides the stock price. Another example could be a service that maps out an efficient route for the delivery of goods. In this case, a business sends a request containing the delivery destinations, which the service processes to determine an appropriate delivery route.

Providers and consumers of web services are frequently businesses, making web services predominantly business-to-business (B2B) transactions. A company or enterprise can be both a provider and a consumer of web services. For example, a wholesale distributor could be in the consumer role when it uses a web service to check on the availability of a product and in the provider role when it supplies prospective customers with different vendors' prices for the product.

In a web services architecture a service is an implementation of a service description and a service description is the metadata describing the service. A service description must include sufficient information for a service requestor to access the service it describes including its interface and location; resource discovery metadata such as classification may also be included.

Generally, a service provider publishes a service description to a service registry. A service requester then finds the service description via the service registry. The services description contains sufficient information for the service requester to bind to the service provider to use the service. Alternatively, a service request may have access to the service description via some other means, such as hard-coding, so that it can communicate directly to the service provider without accessing a service registry.

Several methods are currently available for services to publish descriptions of their requirements or offerings. For example, the Web Services Description Language (WSDL) has been developed for this purpose. WSDL describes a service as a set of 'ports' which group related interactions that are possible between the application (service requester) and the web service (service provider). Interactions to a service are described as 'operations' that may have an input message and optionally a resulting output message. Each operation describes a potential interaction with the web service. This may be a request from an application to the web service or a request from one service to another. Interactions in either direction can be one-way or can require a response. In other words, WSDL describes a service in terms of possible interactions with it. For example a digital library search service might offer a search interface with operations for keyword search (an input message may contain a simple text-based search string) and advanced search (input message contains a number of field-value pairs), in both cases the output message could contain a list of matching result descriptions.

The purpose of Universal Discovery, Description and Integration (UDDI) is to allow consumers to determine what web services are available. UDDI is a specification for distributed registries of web services. A UDDI web services registry is itself a web service that can be accessed via SOAP from an application or other service that wishes to discover web services. UDDI specifies interfaces for applications to publish web services (as WSDL documents) and to discover web services (via their WSDL documents). A UDDI entry actually contains more that just a WSDL interface and implementation, it can also include further metadata such as quality of service parameters, payment mechanisms, security and keywords for resource discovery.

There are generally two different uses for WSDL documents. During development of a web services consumer, the developer needs to know the interface to the service that the application will bind to. When the application is running it needs details of a specific implementation of that service so that it can bind to it. WSDL can be used to specify both interfaces and their implementations. A WSDL document provides information content of interactions with a web service but doesn't explain how to communicate that information between an application and a web service. For this purpose, WSDL allows a 'binding' to be specified. In practice, this is likely to be another XML-based standard, such as SOAP.

In the digital library example above, the service's WSDL description specifies that the search service offers a keyword search operation that takes a text string as its input message. SOAP allows an application to invoke this operation by sending a SOAP message to the service. SOAP specifies the format of the request and response documents, which are generally XML document sent over HTTP. However, currently there is a standard way of encoding WSDL messages in SOAP to achieve interoperability.

There are different ways to group requirements or offering options into sets. However, traditionally web services implementations do not define individual requirements or offerings themselves. There are also different ways to describe the individual requirements or offerings for particular types of web services or for particular aspects of communication between web service components. Additionally, languages like ebXML CPP/A exist that express complete descriptions of a specific set of service requirements and offerings, and that provide a manual process for matching the requirements of a consumer component against the offerings of a provider component.

Traditional web services architectures do not provide a standard way of describing enough of the semantics of individual requirements or offerings to allow automated matching of requirements or offerings. Nor do they provide an algorithm for automatically performing such matches. Additionally, none of the current "semantic web" based mechanisms support descriptions of the types of semantics needed to match typical web service requirements and offerings with web services consumers desires. For example, a consumer web service component may require the use of "DES encryption" or "IDEA encryption", and a provider web service component may offer the use of either "DES encryption" or "AES encryption".

Various semantic web languages such as the Web Ontology Language (OWL) and its derivatives have been proposed for expressing requirements (also known as policy constraints), since such languages can theoretically express the semantics of both policy vocabulary items and constraints on those items. However, none of the current semantic web languages support arithmetic comparison operators for comparing policy constraints. Additionally, since semantic web languages are required to specify far more, and more complex, semantics than a web service policy requires, developing the appropriate taxonomies and ontologies requires skill in semantic web concepts and languages that are not always readily available to web services developers.

Another potential approach for specifying policy constraints is the Object Constraint Language. This language has many of the types of predicate functions needed in a policy constraint language. However, OCL, is not an XML-based language, which is important for web services, and it is not designed to deal with intersection or union of predicate functions. Yet another approach is reflected by the OASIS Standard extensible Access Control Markup Language (XACML) profile for Web Services (also known as WSPL). WSPL provides facilities for defining or specifying both policy sets and policy constraints, but requires the same language syntax be used for defining both policy sets and policy constraints, thus preventing WSPL from interoperating with other policy set definition languages.

Another approach is the ebXML Collaboration-Protocol Profile and Agreement Specification (CPP/A). CPP/A includes one schema (CPP) for describing policies regarding a wide range of "collaboration protocols", including data-transport, reliable messaging, signaling, security, packaging, and specific message exchanges, and another schema (CPA) that describes an agreed-upon set of collaboration protocol parameters. However, CPP/A has no general policy set or policy constraint mechanisms. Instead, all of the functionality uses vocabulary items that have implicit semantics. Thus CPP/A is unable to express constraints on arbitrary new vocabularies, and depends on users accepting the CPP/A vocabulary.

In general, with the exception of WSPL, traditional web-services policy techniques do not include the ability to specify, compare, or combine hierarchies among policy constraints and/or the individual requirement of a policy constraint. Additionally, traditional web-services policy techniques do not provide any ability to specify a preferred order for constraint values, or any other explicit choice mechanisms and only WSPL supports specifying preferred order for policy sets. Furthermore, traditional web-services policy techniques do not provide for policy constraints, requirements or offerings to be defined in a language separate from the language used to define the full policy. Thus, such techniques cannot incorporate policy constraints from policies defined using a different policy definition language without requiring the complete translation of the entire policy. Thus, there is no existing web services or policy definition language that satisfies the requirements of policy constraints.

SUMMARY

Provided is a method for specifying policy constraints for computer and/or software related policies, such as for web services interfaces, and for the automated policy processing, such as finding the intersection (or cross product), of two policy constraints. A policy constraint may be a specification of a value, range of values, or set of values that a particular requirement or offering is allowed to have. Policy constraints may be used as a way of specifying requirements and offerings in a language that supports the specification of collections of requirements and offerings. By inspecting all pairs of collections from a web service consumer and a web service provider, and finding the intersection of the policy constraints applying to a particular requirement or offering, a policy-processing engine may automatically determine whether the consumer's requirements are compatible with the provider's offerings, and may also determine specific values that are acceptable to both and may detect all unsatisfiable sets of constraints in the intersection (or cross product). The consumer may then select values from among those acceptable values to use when communicating with the provider. The provider also may select specific values from among the acceptable values when responding. Alternatively, a policy-processing engine that computes a reduced intersection can use the specified preferences to select specific values on behalf of the consumer and the provider.

Additionally, semantic hierarchies of values for specific requirements and/or offerings may also be expressed and matched such that a more specific case of a requirement or offering may be matched against a more general case of the same requirement or offering. Also, preferences among vocabulary items, vocabulary item values, policy constraints, and other elements of a policy may be specified and automatically taken into account by a policy-processing engine.

Automated matching of consumer requirements against provider offerings may allow a policy-processing engine to deal with specifications of requirements or offerings from any domain-specific schema without having to know the domain-specific semantics of specific requirements or offerings. In other words, a policy-processing engine may not need to be modified to deal with new domains or with new specifications for existing domains. For instance, in one embodiment, Extensible Stylesheet Language Transformations (XSLT) and/or XPATH definitions may be used to translate policy elements from the syntax of one domain-specific language to another.

Thus, common policy-processing engines may work with any type of web services component, and may perform the matching operations for that component automatically. Such a policy-processing engine may work with proprietary descriptions of requirements and offerings without requiring custom code modifications. A policy-processing engine may also interoperate with other mechanisms for specifying collections of requirements and offerings and may handle semantic hierarchies of requirements and offerings. Additionally, a policy-processing engine may be configured to indicate in a generated intersection policy which value within a range or set of values is preferred, either by a specifier, a web services provider, and/or a web services consumer.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Policy constraints may specify requirements and/or offerings for computer and/or software related policies, such as for web services interfaces, in a language that supports collections, hierarchies, and/or preference indications of such requirements and/or offerings. Additionally, automated matching of policy constraints against provider offerings may allow a policy-processing engine to deal with specifications of requirements or offerings from any domain-specific schema without having to know the domain-specific semantics of specific requirements or offerings.

Figure 1:
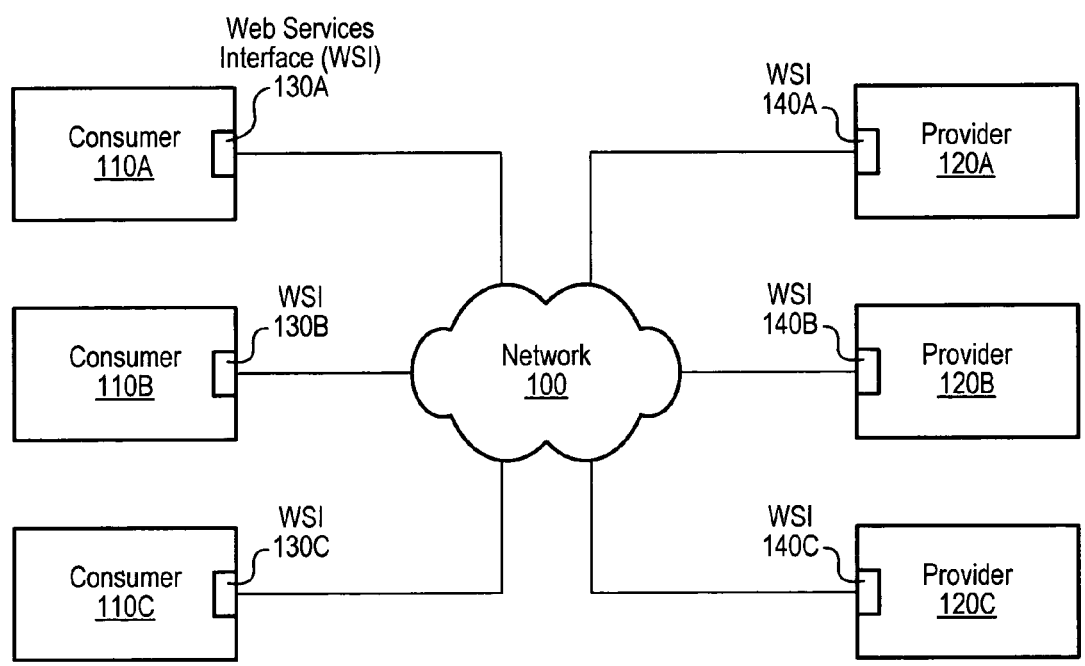
FIG. 1 is a block diagram illustrating web services consumers and web services providers using web service interfaces as known in the prior art.
Figure 2:
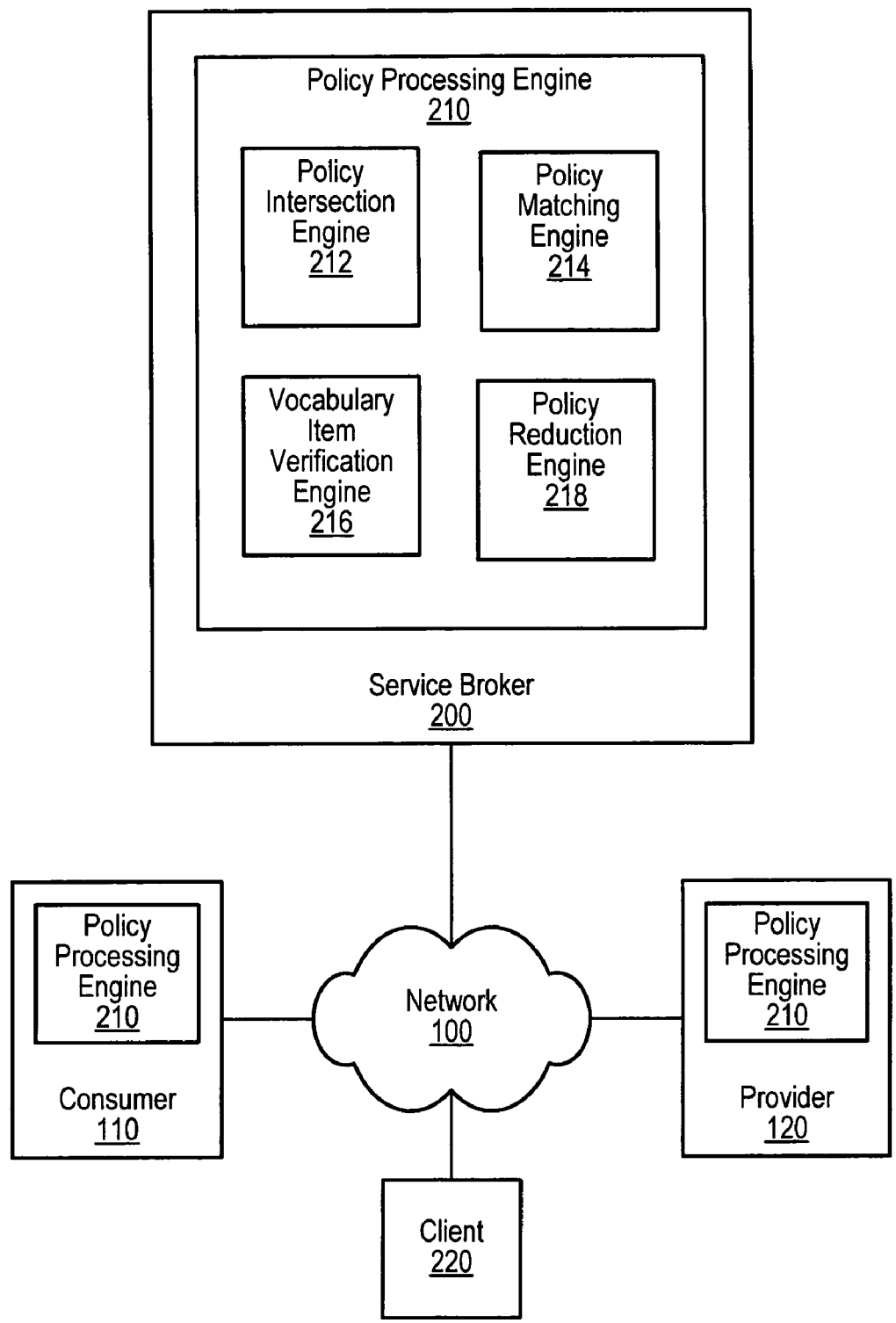
FIG. 2 is a block diagram illustrating, according to one embodiment, a distributed computing environment in which policy constraint matching may be implemented.

For example, as illustrated in FIG. 2, a web services consumer 110 may desire to access a service provided by web services provider 120 over network 100. In order to discover web service provider 120, consumer 110 may access service broker 200, according to one embodiment. For instance, provider 120 may register a service description, such as may be defined using WSDL, with service broker 200. Consumer 110 may access service broker 200 to obtain provider 120's service description, which may include one or more descriptions of the requirements for communicating with provider 120. For example, provider 120 may require encrypted communication and may specify one or more acceptable encryption algorithms in its service description. Additionally, consumer 110 may be configured to use various encryption algorithms that may or may not include those accepted by provider 120. Thus, a policy-processing engine may be used to automatically determine if consumer 110 and provider 120 have any encryption algorithms in common.

Please note that in some embodiments, consumer 110 may itself be a server to other clients, such as client 220, either via web services interfaces or via some other communication mechanism, such as DCOM, RMI and/or IIOP. Additionally provider 120 may also be a client or a consumer to other services.

The various requirements and offerings of provider 120 and the various capabilities, either required or preferred, of consumer 110 may be defined and specified in a manner to enable a policy-processing engine to analyze and determine which if any requirements and offerings of provider 120 are compatible with the capabilities of consumer 110. In some embodiments, a policy-processing engine, such as policy-processing engine 210 may be a stand-alone application or process capable of and configured to communicate with other processes or applications. In other embodiments, however, policy-processing engine 210 may be part of another process or application, such as on consumer 110, provider 120, and/or service broker 200. For instance, in one embodiment, policy-processing engine 210 may be implemented in a library of software functions or as a set of software objects, such as JAVA objects. In yet other embodiments, policy-processing engine 210 may reside on a separate device from a process or application using it and may be configured to communicate across a network, such as network 100. Thus, policy-processing engine 210 may itself be a service in a distributed computing environment, and, in one embodiment, may expose one or more web service interfaces allowing web services consumers and providers to access its policy processing services.

Policy-processing engine 210 may, according to different embodiments, represent or include various types of policy-processing engines. For instance, a policy-processing engine may include a policy-matching engine, such as policy matching engine 214. A policy-matching engine may be referred to as a policy-processing engine that takes two policies and determines whether there is at least one set of vocabulary items that is satisfies both policies.

Another type of policy-processing engine is a policy-intersection engine, such as policy-intersection engine 212, that may take two policies and produce a new policy such that every set of vocabulary items that satisfies both the original policies also satisfies the new policy. Additionally, every set of vocabulary items that is rejected by either of the two original policies is also rejected by the new policy. For example, a policy-intersection engine may append a second policy to the first policy such that every potential set of vocabulary items must be evaluated against both original policies. In some embodiments, for example those embodiments including policies specifying sets of predicates over vocabulary item values (e.g. policy sets), a policy-intersection engine may append the second policy to the first by computing a cross product of the predicates in the two policies. Each element in the cross product results in a new policy set that contains all the predicates from one policy set from each of the two original policies. Such appended, or "cross product", policies may be used by a vocabulary item verification engine, described below, to successfully determine whether any specific set of vocabulary item values satisfies both of the original policies.

Policy-processing engine 210 may also represent or include a policy-reduction engine, such as policy-reduction engine 218, that takes a single policy and eliminates all conflicting and/or redundant sets of predicates. For example, a policy-reduction engine may be used to reduce (i.e. remove inconsistent constraints or predicates from) an intersection policy generated by a policy-intersection engine. A policy-reduction engine may detect conflicts between individual predicates (or constraints). For example, if one policy set includes a constraint specifying that a vocabulary item "a" must be greater than 5 ("a>5"), and another constraint specifying that "a" must equal 2 ("a"=2), a policy-reduction engine may determine that the two constraints are inconsistent and remove that policy set. In other words, a policy-reduction engine may analyze the constraints of each policy set in a policy and if it determines that no possible vocabulary item values could satisfy the particular constraints of a policy set, that policy set is removed, according to some embodiments. If after removing all conflicting predicates (e.g. constraints), there are no sets of predicates left, there can be no vocabulary values that satisfy the original policy.

Additionally, a policy-reduction engine may replace overlapping predicates with a single predicate that accepts (or is satisfied by) the intersection of the vocabulary items accepted by the overlapping predicates. Thus, a policy-reduction engine may merge overlapping constraints into a single constraint equivalent to the original overlapping constraints. In other words, any vocabulary item values that satisfy all of the original overlapping constraints will also satisfy the merged constraint and vice versa. For example, if a policy set includes the constraints of "a>5" and "a=10", the two constraints may be merged into a single constraint "a=10".

Finally, a fourth type of policy-processing engine may be a vocabulary item verification engine, such as vocabulary item verification engine 216. A vocabulary item verification engine compares a particular vocabulary item instance to one or more constraints (predicates) that reference the vocabulary item. The vocabulary item verification engine determines whether or not the vocabulary item satisfies (or is acceptable to) the particular constraints, according to some embodiments.

In general, the term "policy-processing engine", as used herein, may refer to a policy-intersection engine, a policy-matching engine, a policy-reduction engine, a vocabulary item verification engine and/or any combination of those engines. Thus, policy-processing engine 210 may include any or all of the above-referenced types of policy-processing engines, depending upon the specific nature of various embodiments. For instance, consumer 110 may include a policy-processing engine that includes all four types individual policy-processing engines, while service broker 200 may include a policy-processing engine that does not include a vocabulary item verification engine.

For example, web services provider 120 may use a particular schema to specify message security headers. One element in such a schema may be a specification of the length of the encryption key that should be used in a message security header. This "encryption key length" is one vocabulary item in the vocabulary (the schema) used in the security header to describe message security characteristics. For instance, in one embodiment, provider 120 may require that encryption key lengths must be greater than or equal to some minimum length considered secure, but less than or equal to some maximum length determined by limits on lengths that provider 120's encryption software is designed to support. Provider 120 may specify the range of encryption key length values that it will accept using a policy constraint language, such as WS-PolicyConstraints, described herein. Additionally, web services consumers, such a web services consumer 110 may desire to use a specific encryption key length, or range of key lengths, and may express key length(s) using the same policy constraint language. Given a service's expression of the range of values that the service will accept and a particular message security header from a web services consumer, a policy-processing engine or vocabulary item verification engine may verify that the key length specified in the header satisfies the requirements of the service.

Alternatively, a service broker may use a policy-processing engine or policy-matching engine to determine whether a web services provider and a web services consumer have any policies in common. For example, given web services provider 120's acceptable encryption key lengths, and the encryption key lengths that web services consumer 110 is capable of, or willing to use, service broker 200 may use policy-processing engine 210, or a policy-reduction engine of policy-processing engine 210, to determine those encryption key lengths in common between consumer 110 and provider 120. While above examples use expressions of policy constraints to dynamically determine how a web services consumer may properly communicate with a web services provider, a web services deployer may also describe, using a policy constraint language, a range of key length values that a particular web services provider, such as web services provider 120 may support for a particular deployment, or instance, of that web service (out of a possibly larger range that the service software is actual capable of supporting).

Specifications of constraints on vocabulary items may represent one component of a web service's overall policy. Web services policies may be described using various functional policy layers.

Policy Architecture

Figure 3:
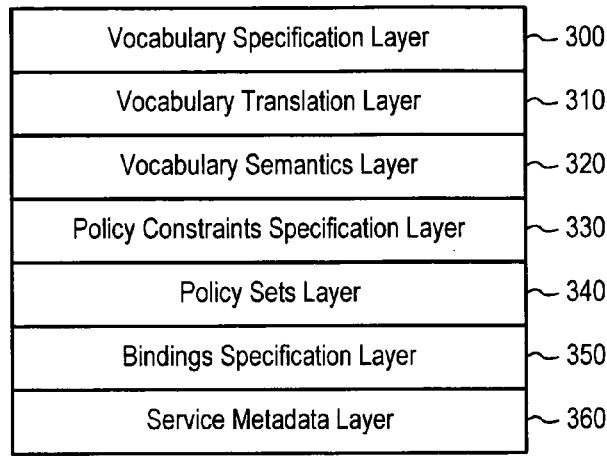
FIG. 3 is a block diagram illustrating various layers of a policy definition, according to one embodiment.

For example, FIG. 3 illustrates various functional layers of a policy architecture. Please note that the layers illustrated in FIG. 3 and described here may not be included in all embodiments, depending upon the exact nature of specific embodiments. For example, some embodiments may not include a vocabulary translation layer 310. Vocabulary specification layer 300 may specify the syntax and semantics of discrete elements or vocabulary items used in a particular policy. Vocabulary specification layer 300 may define the syntax and semantics of vocabulary items using any of various policy vocabulary languages, such as WS-Security, WS-Reliability and OWL.

Vocabulary translation layer 310 may define mappings for translating vocabulary specifications defined in one vocabulary syntax to a vocabulary syntax used by policy constraints specification layer 330, described below. Vocabulary semantics layer 320 may also define domain-specific semantics of the vocabulary.

Policy constraints specification layer 330 may specify sets of values, otherwise referred to as constraints, for individual vocabulary items of a policy. Policy constraints may be defined in any suitable policy constraint language such as WS-PolicyConstraints, described herein.

Policy sets specification layer 340 may specify set of constrained vocabulary items that are acceptable for a particular policy. For instance, policy sets specification layer 340 may express various interdependent combinations of constrained vocabulary items that are acceptable for a policy. Policy sets may be specified using languages such as WS-Policy and the proposed Compositors extension to the Features and Property section of WSDL.

Bindings specification layer 350 may specify which policies are bound to which aspects of a service. For instance, a message security header policy may be bound to a messaging interface of a service. Such bindings may be specified using WS-PolicyAttachments or the Features and Properties section of WSDL 2.0, among other possible languages.

Policies

A policy may be a description of behavior, particularly of desired or intended behavior. While some policies may govern corporate behavior, such as equal employment policies or privacy policies, computer applications also have behaviors, and these can also be described using policies. One familiar example is an "access control policy" that describes how an application should behave with respect to allowing access to resources. Please note that an access control policy is only one example from a broad range of computer application behaviors that could be described using a policy. Such policies describe the constraints that determine the application's behavior. Some application constraints are determined by inherent capabilities. For example, an application either has the code required to support a given message encryption mechanism or not. Other application constraints are determined by decisions that constrain how the inherent capabilities are to be used. For instance, the deployer of a service application may have enabled only one of two built-in encryption mechanisms. Any policy that describes the behavior of a computer application must take into account both the policy decisions and the inherent capabilities that constrain the application's behavior.

Regarding web services, policies may be associated with an entire set of web services, with a web service as a whole, or with particular parts of a service such as ports or endpoints, bindings, port types or interfaces, operations, messages, or even with individual parts of messages. A policy may be associated with a generic type of service or with a specific instance of a service or one of its sub-parts. In some embodiments, bindings specification layer 340 may associate policies with services or parts of services. For instance, WSDL (though its Features and Properties descriptions) and WS-PolicyAttachments (WSPA) provide ways to associate policies with services. Additionally, WSDL itself, UDDI, SOAP, and WS-MetadataExchange (WSMD) all provide ways in which policies and other service metadata are made available to service clients or to other services.

Policy Example

An example web services policy for message security headers may be defined as:

A security token type must always be either a KerberosV5TGT or an X509v3 certificate. If a message being transmitted includes an "AccountNumber" message part, then the 3DES-CBC encryption algorithm must be used; otherwise encryption is optional but must be 3DES-CBC if used.

Policy Vocabularies

A policy uses one or more particular vocabularies to specify behaviors. In the world of corporate policies, the vocabulary for privacy policies might include items such as "data category", "user category", "third party", "consent to disclose", "mailing list", "record retention period", etc. In the world of web services, as used herein, a vocabulary may be an independent set of technical features and parameters, called vocabulary items, that are associated with some aspect of using a web service. For example, the vocabulary in the security headers policy example above includes vocabulary items such as "security token type", "message part", and "encryption algorithm". "KerberosV5TGT" and "X509v3" are possible values for the "security token type" vocabulary item, "AccountNumber" is a value for the "message part" vocabulary item, and "3DES-CBC" is a value for the "encryption algorithm" vocabulary item.

As a further example, a vocabulary associated with reliable messaging might include items such as "time to live", "number of retries" and "interval between retries". A vocabulary associated with services that offer computational resources might include items such as "gigaflops", "number of processors available", and "platform architecture". Other Items that might occur in various vocabularies include "offer price", "minimum bandwidth", "date of service", "time of service request", "client security token type", and "client IP address".

Vocabularies for web services may be defined in several categories of written specifications. For instance, some specifications may describe capabilities associated with almost any web service. Examples of this type of specification include WS-Reliability (WSRM) and WS-Security (WSS). Such specifications are usually created by cross-industry standards organizations. Other specifications may describe capabilities common to a particular class of services, such as services offering computational resources or services offering music downloads. Standards groups within a specific industry usually create these types of specifications. Yet other specifications describe capabilities associated with a particular service. These types of specifications may be created by an individual vendor or other enterprise, and may be proprietary or internal to the enterprise.

Vocabulary items may be expressed in various forms. Web service specifications are frequently associated with an XML Schema, elements of which make up the vocabulary. Vocabulary items may also be expressed as attributes of languages such as eXtensible Access Control Markup Language (XACML) or Security Assertions Markup Language (SAML). Alternatively, vocabulary items may be converted to one of these formats from some other format. A policy may also use vocabulary items from multiple vocabularies or may use only part of a single defined vocabulary. As used herein, the term 'attribute' may refer to the identity, data type and value for a single vocabulary item. For example, a message reliability policy may specify various parameters using a WS-Reliability vocabulary, but may also qualify those parameters by using environmental vocabulary items, such as time of day.

The semantics, or meanings, of vocabulary items may be expressed as part of the vocabulary specification. Semantic web languages such as Web Ontology Language (OWL) and Resource Description Framework (RDF) attempt to provide a standard computer-readable description of the semantics of a vocabulary, but currently semantic descriptions are captured only in custom code modules. Note that, conceptually, vocabulary items need not be independent. For example, an "age" item may be related to a "birthdate" item, or "ship date" may be related to "order date". Requiring vocabulary items to be independent, however, may eliminate the possibility of various types of errors in policies, such as inconsistent circular dependencies (e.g. A>B AND B>C AND C>A).

Policy Statements

A policy statement may be a computer-readable expression used to convey a policy between entities. An application deployer, for example, may use a policy statement to convey to the application itself constraints that are to be placed on the application's inherent capabilities. In another example, a service provider may use a policy statement to convey the constraints of the service to potential service consumers. In yet another example, a service consumer application may use a policy statement to convey the constraints that its user requires of a service to a service broker or to a service itself. Policies are not always in the form of explicit policy statements. An application's policies may be hard-coded, or may be set via some application- or platform-specific set of deployment parameters.

As described above, web services specifications have traditionally defined their own policy statement syntax. Greater functionality and interoperability, as well as smaller footprints and easier management of services, may be possible if the syntax for policy statements is specified in a standard way. Standard policy statements may be useful even if not all web service components use them. For example, a client application may be written to understand standard policy statements exported by services the client will use even if the client's own policies are stored in an internal format. Only having one format to understand may make client software easier to design, code, and maintain.

One way to express standard policy statements may be to describe the combinations of predicates, or constraints, on vocabulary items that are acceptable for a given policy. Policy statement may be expressed in disjunctive normal form, which may be considered a standard way of organizing a logical expression as sets of predicates, where the predicates in a set are related by AND, while the sets themselves are related by OR; such as "{a AND b AND c} OR {b AND d}". Disjunctive normal form may be useful in determining whether an expression is satisfied by a particular set of terms because each set can be evaluated separately; if any set is satisfied, then the entire expression is satisfied. In general, any Boolean combination of independent predicates can be expressed in disjunctive normal form. For example, there may be various ways of expressing this aspect of the example policy used above, but they are all equivalent to the following set of sets, which may be expressed in disjunctive normal form (an OR of ANDed simple predicates):

```
{
    { "SecurityTokenType" EQUALS "KerberosV5TGT",
      "MessagePart" EQUALS
      "AccountNumber","EncryptionAlgorithm" EQUALS "3DES-CBC" },
    { "SecurityTokenType" EQUALS X509v3",
      "MessagePart" EQUALS "AccountNumber",
      "EncryptionAlgorithm" EQUALS "3DES-CBC" },
    { "SecurityTokenType" EQUALS "KerberosV5TGT",
      "MessagePart" NOT EQUAL TO "AccountNumber",
      "EncryptionAlgorithm" EQUALS "3DES-CBC"},
    { "SecurityTokenType" EQUALS "X509v3",
      "MessagePart" NOT EQUAL TO "AccountNumber",
      "EncryptionAlgorithm" EQUALS "3DES-CBC"},
    { "SecurityTokenType" EQUALS "KerberosV5TGT",
      "MessagePart" NOT EQUAL TO "AccountNumber",
      "EncryptionAlgorithm" NOT PRESENT },
    { "SecurityTokenType" EQUALS "X509v3",
      "MessagePart" NOT EQUAL TO "AccountNumber",
      "EncryptionAlgorithm" NOT PRESENT }
}
```

The policy expressed by the above policy sets may be satisfied if at least one of the sets of constraints is satisfied. In order to make the management of policies tractable, a policy may consist of multiple sets of policy sets, each associated with a different aspect of communication or with a different service interface. For example, there may be one policy set for security parameters, another for reliable messaging parameters, and another for service-specific options such as price and quantity. Such policy sets may be defined in a policy sets layer, such as policy sets layer 340, of a web services architecture.

In addition to specifying policy sets, policy sets layer 340 may also perform other functions. It may provide a way to express relative preferences among the various policy sets. If the language allows policies to be expressed in a form other than disjunctive normal form, the language should provide an algorithm for obtaining the policy sets in normal form, since this is the best form for automatic matching of policies.

Policy sets layer 340 may, in some embodiments, provide a mechanism for determining which aspect each policy applies to. This might be specified, for example, by constraints that indicate the vocabularies used by a particular policy set. Additionally, in one embodiment, bindings specification layer 350 may provide some mechanism for determining which interface each policy applies to.

Policy Constraints Specification

Each constraint in a policy may specify an allowable value, range of values, or set of values for a particular vocabulary item. For instance, in one embodiment, a policy constraint may specify a vocabulary item, an operator, and either another vocabulary item or a literal value. For example, the individual constraints of the above policy example might be expressed as:

---
"SecurityTokenType" IS A MEMBER OF {"KerberosV5TGT", "X509v3"}
"MessagePart" EQUALS "AccountNumber"
"MessagePart" NOT PRESENT
"EncryptionAlgorithm" EQUALS "3DES-CBC"
"EncryptionAlgorithm" NOT PRESENT
---

A policy constraints language, such as WS-PolicyConstraints described herein, may provide a way to express such constraints. It may also provide a set of operators for specifying values, ranges of values, and sets of values of various types. A policy constraints language may also provide a way to specify which end of a range of acceptable values, or which elements in a set of acceptable values are preferred by a particular web services entity.

Referring to the web services architecture layers illustrated in FIG. 3, policy sets layer 340 may use the constraints specified in policy constraints specification layer 330 to express acceptable sets of constraints for the policy. For example, the message security header policy used above may be expressed:

---
{  "SecurityTokenType" IS A MEMBER OF {"KerberosV5TGT", "X509v3"},
    "MessagePart" EQUALS "AccountNumber",
    "EncryptionAlgorithm" EQUALS "3DES-CBC" },
{  "SecurityTokenType" IS A MEMBER OF {"KerberosV5TGT", "X509v3"},
    "MessagePart" NOT EQUAL TO "AccountNumber",
    "EncryptionAlgorithm" EQUALS "3DES-CBC"},
{  "SecurityTokenType" IS A MEMBER OF {"KerberosV5TGT", "X509v3"},
    "MessagePart" NOT EQUAL TO "AccountNumber",
    "EncryptionAlgorithm" NOT PRESENT },
---

Please note that, by utilizing operators such as "IS A MEMBER OF <set>", the number of constraints required to express the policy sets may in some embodiments be reduced. Thus, rather than requiring two constraint definitions, one to specify "SecurityTokenType" EQUALS "KerberosV5TGT" and another to specify "SecurityTokenType" EQUALS "X509v3", there may be a single constraint specifying "SecurityTokenType" IS A MEMBER OF {KerberosV5TGT, X509v3}.

Specifying multiple constraint values as a range by using appropriate constraint operators may be particularly important in embodiments where vocabulary items may have a large range of values, such as time periods, IP addresses, or prices. For example, it may be prohibitive (or impossible, depending on the granularity needed) to express every possible time between 9 am and 5 pm as single policy constraints.

Vocabulary items that must not be present (prohibited items) may be defined either by policy constraints specification layer 330 or by policy sets layer 340. In one embodiment, the policy constraints specification layer 330 may define prohibited vocabulary items as a constraint on the vocabulary item itself. However, in other embodiments, policy sets layer 340 may define prohibited vocabulary items as a characteristic of a policy set. Another type of policy constraint that may logically be specified by either policy constraints specification layer 330 or policy sets layer 340 is a vocabulary item that must be present, but may have any value (i.e. is unconstrained).

A policy constraint language may provide predicate operators such as EQUALS <value>, EQUALS <value set>, IS GREATER THAN <value>, IS GREATER THAN OR EQUAL TO <value>, IS LESS THAN <value>, IS LESS THAN OR EQUAL TO <value>, IS AN ELEMENT OF <value set>, and IS A SUBSET OF <value set>. Depending on the policy sets language used, the policy constraint language may provide operators that define both required but unconstrained items and prohibited items. Since the implementation of the comparison and set operators depends on the data type of the values involved, a policy constraint language may also provide a way to determine the data type of each vocabulary item or item value, and may be able to specify a rich set of data types. The policy constraint language may also provide a way of specifying preferred vocabulary item values where a constraint allows a vocabulary item to have a range or set of values.

Intersection of Policy Constraints and Policies

Use and analysis of policies may require the ability to compute the intersections of constraints and/or of policies. Even if no physical intersection document is constructed, users of policies may need to have the types of information required to perform an intersection, so precise specification of these semantics may be useful.

As an example of the need for constraint intersections, a policy set may contain two constraints that are inconsistent; i.e. two constraints that can never both be satisfied by any vocabulary item value. More formally, two constraints are inconsistent if they place constraints on the same vocabulary item, but the intersection of the sets of values accepted by the two constraints is empty. A policy set that contains two or more inconsistent constraints is itself inconsistent, and may be eliminated from the set of policy sets because that policy set can never be satisfied (this elimination will not change the meaning of the rest of the policy since policy sets are logically connected by OR operators). If, after all inconsistent policy sets have been eliminated, there are no remaining policy sets, the policy itself may never be satisfied. For any policy that will be evaluated multiple times, it may be more efficient to remove inconsistent policy sets before doing any evaluation, rather than waste effort evaluating impossible-to-satisfy conditions over and over.

As another example of the need for policy intersections, take the case of two web services entities that wish to communicate. In order to communicate, they may need to use a set of vocabulary item values that satisfies the policies of both entities; i.e. they may use a set of vocabulary item values that satisfies the intersection of both policies. When vocabulary items are independent, the acceptable vocabulary items may be those that satisfy all the constraints of one policy set from the first entity's policy and all the constraints of one policy set from the second entity's policy. These combinations of policy sets to be satisfied are represented by the cross product, or intersection, of the two policy sets. Many of the policy sets in this intersection may be inconsistent. In order to know whether the two entities have any mutually acceptable policy, the inconsistent policy sets may need to be eliminated. If at least one policy set remains, the two policies may be considered consistent, and any set of vocabulary items that satisfies at least one of the remaining policy sets will be acceptable to both entities. In some embodiments, an intersection of two policies will include removing any inconsistent (i.e. unsatisfiable) policy sets. Again, eliminating the inconsistent policy sets may require determining whether any constraints are inconsistent, which may include determining the intersection of constraints on the same vocabulary items.

A policy constraint language, such as WS-PolicyConstraints described herein, may provide algorithms for determining the intersection of policy constraints. A policy-processing engine, such as policy-processing engine 210, may implement such an algorithm for constraints or policies defined in the policy constraint language. Thus, a policy-processing engine may determine the intersection of any two policy sets and/or the intersection of any two policies. For instance, the intersection of two policies may be defined as a single policy that exactly validates the intersection of the sets of vocabulary items validated by the two individual policies. The intersection may be computed by taking the cross product of the policy sets in the two policies, according to some embodiments.

For example, a first policy may include two policy sets:

{A, B, C} and {E, F} and a second policy may include two other policy sets:

{G, H, I} and {J, K}.

To compute the intersection of the first and second policies, the cross product of the two policies may be determined:

{A, B, C}+{G, H, I}, {A, B, C}+{J, K}, {E, F}+{G, H, I}, {E, F}+{J, K}.

The cross product may also be written:

{A, B, C, G, H, I}, {A, B, C, J, K}, {E, F, G, H, I}, {E, F, J, K}.

Thus, the intersection of:

{{A, B, C}, {E, F}} and {{G, H, I}, {J, K}} may be

{{A, B, C, G, H, I}, {A, B, C, J, K}, {E, F, G, H, I}, {E, F, J, K}}

Note that in the above example, each letter may represent a different policy constraint in a policy set of a policy. It should be noted that two constraints that reference the same vocabulary item may be referred to as coincident. Thus, if the intersection of two coincident constraints is empty, then the two constraints are incompatible. For instance, if one constraint specifies an encryption key length of no greater than 64 bits and another constraint specifies an encryption key length of no less than 65 bits, those two constraints are incompatible. Any policy set that contains incompatible constraints may be eliminated from its parent policy, according to one embodiment. The resulting policy, after eliminating any policy sets that include incompatible constraints, may be equivalent to the policy prior to elimination the policy sets since the policy sets including incompatible constraints could never be satisfied by any instance of the relevant vocabulary item. Additionally, the intersection of any two coincident constraints may be one of: the empty set, a set containing the two constraints, or a set containing only a singe constraint (e.g. if the two constraints were equal, or if one was a subset of the other).

In some embodiments, a policy-processing engine, such as policy-processing engine 210, may not only determine the policy intersection, but may also need to select from that policy intersection a specific preferred policy set containing preferred vocabulary item values. Various entities, such as a web services consumer, provider, service broker, or even an originating client, may each specify their own preferences with respect to various policy sets, or policy constraints. Since, for example, the preferences of a consumer may conflict with the preferences of a provider, the policy-processing engine, no matter whether initiated by the consumer, provider, service broker, or other entity, may have to resolve conflicts between conflicting preferences. The policy-processing engine may be configured to use the values preferred by the entity that is running the policy-processing engine. In other words, if consumer 110 uses policy-processing engine 210, policy-processing engine 210 may select those values preferred by consumer 110. Similarly, when provider 120 uses policy-processing engine 210, policy-processing engine 210 may select values preferred by provider 120. When a third party entity, such as service broker 200 uses policy-processing engine 210, policy-processing engine 210 may be configured to apply some "fair" resolution algorithm. For instance, policy-processing engine 210 may randomly select values from among those values preferred by consumer 110 and provider 120.

In some embodiments, the values specified in a policy constraint may be associated with a semantic hierarchy, either at the policy sets layer, the vocabulary specification layer, or the policy constraints layer. The intersection of two coincident equality policy constraints that specify values that are not equal, but are in the same semantic hierarchy may result in an equality constraint in which the vocabulary item is the same and the literal value may be the union of the semantics of the two input values (i.e. the descendant, or most specific, value). Additionally, if the two original values are specified as having equivalent semantics, the intersection of the two constraints may be either one of the two original constraints. Furthermore, if the values are not in the same semantic hierarchy, then the two policy constraints may not be compatible. Taking an intersection of two policies including hierarchically configured values is discussed in more detail below regarding FIG. 11.

For example, if a first policy constraint specifies a 'string-equal(movie type, "action movie")' constraint and a second policy constraint specifies a 'string-equal(movie type, "James Bond movie")' constraint, and "James Bond movie" inherits all the semantics of "action movie", then the intersection of the two policy constraints may be the constraint 'string-equal (movie type, "James Bond movie")'. In other words, if one policy constraint specifies that a "movie type" vocabulary item must have an "action movie" value, and another policy constraint specifies that the "movie type" vocabulary item must have a "James Bond movie" value and the "James Bond movie" value is defined as being a part of an "action movie" semantic hierarchy, the intersection of the two policy constraints may specify that the "movie type" vocabulary item have value of "James Bond movie".

Policy Merging and Overwriting

In some embodiments, policies may need to be merged or replaced. For example, bindings specification layer 350 may allow one policy to be specified for a service as a whole, and another policy to be specified for some particular interface of the service. Bindings specification layer 350 may also be responsible for defining the relationship between the two policies. For example, bindings specification layer 350 may specify whether the specific interface policy is supposed to replace, strengthen, or weaken the overall service policy. Applying a replacement policy is straightforward, but computing strengthened or weakened policies may be more complex. If one policy weakens another, then only a set of vocabulary items that satisfies both policies may be acceptable. The effective joint policy in such a case may be the intersection of the two policies, as described above. If one policy strengthens another policy, then any set of vocabulary items that satisfies either policy may be acceptable. The effective policy in this case may be a policy consisting of the union of the policy sets of the two original policies.

A policy union may contain redundant policy sets. That is, one policy set may accept a subset of the vocabulary items accepted by another policy set. For efficient application or for analysis of the effective policy, it is useful to eliminate redundant policy sets. Formally, a policy set may be considered redundant with respect to a second policy set if the intersection of the two policy sets is equal to the first policy set.

Translation of Vocabulary Specifications

Sometimes a vocabulary specification may not be available to a policy-processing engine. This might be the case, for example, where the vocabulary specification uses a proprietary XML schema.

In these cases, someone with access to the vocabulary schema may define a set of XSLT transforms to convert instances of the vocabulary specification to a non-proprietary format, such as another XML format or to a set of XACML attributes. The resulting format may be published as an alternative vocabulary specification. Policies may then be written against this alternative, non-proprietary vocabulary specification. Any instance of the proprietary vocabulary specification may be processed by the XSLT transforms prior to use with policy processing entities.

For example, a service using a proprietary vocabulary specification might perform the XSLT transforms, and then use the resulting non-proprietary form of the vocabulary specification in its WSDL description, in one embodiment. Policies for that service may then be defined from the non-proprietary form of the vocabulary specification. Standard policy processing engines may then process any such policies.

Figure 4:
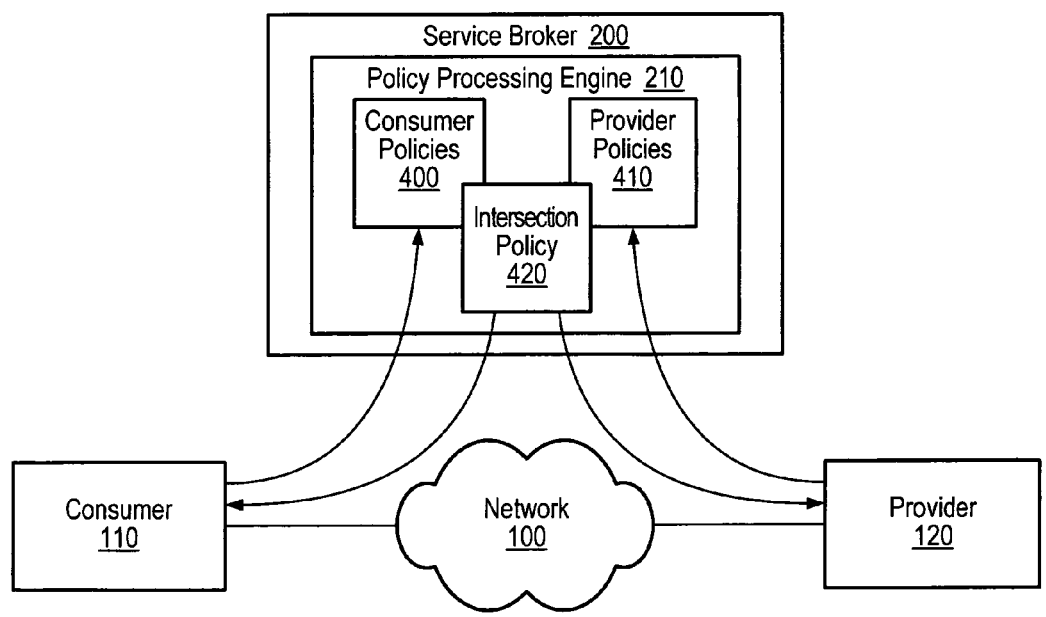
FIG. 4 is a block diagram illustrating a service broker determining a common policy for communication between a web services consumer and provider, in one embodiment.

Turning now to FIG. 4, which is a block diagram illustrating a service broker using a policy-processing engine to determine a common policy set for use between a web services consumer and a web services provider. In some embodiments, a web services provider, such as provider 120 in FIG. 4 may register a service description with a service broker, such as service broker 200. As described above, web services consumers, such as consumer 110, may access or communicate with a service broker to locate a particular web service and the service broker may search through registered service description to locate an appropriate web services provider. In order to be located by consumers via a service broker, web services providers may register with the service broker and may, in some embodiment, send the service broker a service description and/or a set of the provider's policies. For example, in one embodiment, provider 120 may be part of a GRID computing environment and service broker 200 may be configured to determine and utilize unused processing power from computers coupled to network 100. In other embodiments, however, provider 120 may be a stand-alone web services provider, such as the stock quote service described above. A service description may include policies, such as provider policies 410, associated by provider 120 with particular service interfaces provided by provider 120. In other embodiments however, the service description may include policies for an entire service provided by provider 120. Provider 120 may specify its service description in a description specification language, such as WSDL, in some embodiments.

In order to locate an appropriate set of policies for communicating with provider 120, consumer 110 may, in some embodiments, send a request to service broker 200 identifying one or more service interfaces consumer 110 is capable of using and desires to use when communicating with provider 120. Additionally, consumer 110 may send consumer policies 400 to service broker 200. In one embodiment, consumer 110 may send a WSDL based description of its policy sets. In some embodiments, consumer 110 may not have any information regarding the interfaces exposed by provider 120 and may therefore send its entire policy, possibly including many individual policy sets, to service broker 200. In other embodiments, however, consumer 110 may only send a relevant subset of its policy to service broker 200. In some embodiments, both provider policies 410 and consumer policies 400 may be defined/specified using a policy sets language that allows specification and expression of individual policy constraints. In one embodiment, a constraint language, such as WS-PolicyConstraints described herein, may be used to define the individual policy constraints in consumer policies 400 and/or provider policies 410.

After receiving both provider policies 410 and consumer policies 400, service broker 200 may compute the intersection of the consumer's policies with each of the provider's policies. For example, in one embodiment, service broker 200 may utilize a policy-processing engine, such as policy-processing engine 210, to determine the intersection of the consumer's policies with each of the provider's policies. Please note, as described above, policy-processing engine 210 may be a stand alone application, in which case service broker 200 may send both provider policies 410 and consumer policies 400 to policy-processing engine 210. In other embodiments, however, policy-processing engine 210 may be a part of service broker 200, such as a library or set of programming objects,. Regardless of the exact relationship between service broker 200 and policy-processing engine 210, policy-processing engine 210 may calculate the intersection of consumer policies 400 with each of the policy sets of provider policies 410.

If the computed intersection of consumer policies 400 and one policy set of provider policies 410 is not empty (i.e. it has at least one satisfiable policy set), consumer policies 400 may be consistent with that policy set from provider policies 410. Service broker 200 may, in some embodiments, send to consumer 110 intersection policies 420, which may include one or more intersection policies for consumer policies 400 and provider policies 410. In one embodiment, service broker 200 may also send additional information to consumer 110, such as the address of the interface to which the intersection policy may be bound on provider 120. Service broker 200 may also be configured to send intersection policies 420 to provider 120, according to one embodiment. In other embodiments, however, service broker 200 may only send intersection policies 420 to consumer 110 and rely upon consumer 110 to send intersection policies 420, or a subset of intersection policies 420, to provider 120, as will be discussed regarding FIG. 6, below.

After receiving the intersection policies 420 from service broker 200, consumer 110 may, in some embodiments, send messages to provider 120 according to intersection policies 420. For instance, in one embodiment, intersection policies 420 may specify that all messages to provider 120 must use a particular encryption algorithm, such as 3DES-CDC (triple DES encryption with cipher block chaining). In such an embodiment, consumer 110 may, because 3DES-CBC was specified in intersection policies 420, use that particular encryption algorithm when sending messages to provider 120. Consumer 110 may select particular vocabulary item values that satisfy the policy sets in intersection policies 420. Consumer 110 may not need to use all the values in a policy set. For example, some values may pertain only to what must be in the response from a provider. Thus, consumer 110 may choose values that are consistent with more than one of the policy sets in intersection policies 420 and provider 120 may then select values from one of the policy sets for which consumer 110 selected values.

In some embodiments, intersection policies 420 may include all the policy sets that are intersections of consumer policies 400 and provider policies 410. Thus, consumer 110 may be configured to select vocabulary values that satisfy one or more of the policies sets from intersection policies 420 for use when communicating with provider 120. For example, consumer 110 may be configured to select values that satisfy a policy set from intersection policies 420 that specifies constraint values that most closely match consumer 110's preferred set of values. Consumer 110 may be configured to utilize a policy-processing engine to determine which policy sets in intersection policies 420 may match consumer 110's preferred policy set. In some embodiments, however, service broker 200 may be configured to send only one intersection policy set in intersection policies 420.

Additionally, in some embodiments, consumer 110 may be configured to send intersection policies 420, or alternatively, a selected policy set from intersection policies 420 to provider 120 so that provider 120 may verify that messages from consumer 110 satisfy the selected policy set. In one embodiment, consumer 110 may send intersection policies 420 to provider 120 when first establishing a web services session with provider 120. In other embodiments, however, consumer 110 may send intersection policies 420 to provider 120 at other times, such in response to a request from provider 120. As noted above, when sending messages, such as response messages, to consumer 110, provider 120 may be configured to construct those messages according to intersection policies 420. Additionally, provider 120 may use vocabulary item values indicated as preferred by consumer 110.

According to some embodiments, preferred policy sets may be specified before non-preferred policy sets in a policy definition, according to one embodiment. Additionally, in some embodiments, preferred policy sets may be identified using a different mechanism, such as by including a specific "preferred" element in a policy set definition.

Also, in embodiments where a policy is not specified in Disjunctive Normal Form (DNF), a DNF generation algorithm that preserves preference may generate policy sets using nodes to the left under any operator having "OR" semantics before using nodes to the right. For example, a policy may define the following policy sets (where A, B, C and D are individual policy constraints on vocabulary items): AND (OR (A, B), OR (C, D)). The same policy set in order of preference may be: {A, C}, {B, C}, {A, D}, {B, D}.

As with policy sets, preferences among vocabulary item values specified in a single policy constraint may be indicated by the order in which the values are specified in the policy constraint. For example, the ordering of the set values in the policy constraint "a" IS-A-MEMBER-OF {10, 5, 8} may be used to specify preferences among those values. In this case, the value "10" may be preferred over the value "5", which in turn is preferred over the value "8". In other embodiments, however, preferences among vocabulary item values specified in a single policy constraint may be identified using a different mechanism, such as by including a value preference indicator in the policy constraint definition.

According to some embodiments, policy constraints may express a set or range of values for a vocabulary item. Preferences among vocabulary item values may be indicated by the order in which the values are specified in the definition of a set of values. In some embodiments, however, preference among vocabulary item values (form among an set of values) may be indicates using a different preference mechanism, such as in a policy set or vocabulary item definition. Additionally, an XML "preference" attribute in an <Apply> element may indicate whether the "greater" or "lesser" values of a range of vocabulary item values are preferred, according to some embodiments. For example, for a policy constraint defined as:

```
<Apply FunctionID="time-in-range" Preference="greater">
    <AttributeSelector RequestContextPath=".../transaction-time/text( )">
    <AttributeValue>9am</AttributeValue>
    <AttributeValue>5pm</AttributeValue>
</Apply>
``` the preferred values may be values closer to 5 pm, since those time values (in 24-hour time) are greater than values closer to 9 am.

As another example, for a policy constraint defined as:

```
<Apply FunctionId="time-is-in">
    <AttributeSelector RequestContextPath=".../transaction-time/text( )">
        <Apply FunctionId="time-bag">
            <AttributeValue>5pm</AttributeValue>
            <AttributeValue>8pm</AttributeValue>
            <AttributeValue>7am</AttributeValue>
        </Apply>
</Apply>
``` the most preferred value may be 5 pm, followed by 8 pm, followed by 7 am, since the values are specified in this order in the policy constraint definition.

Figure 5:
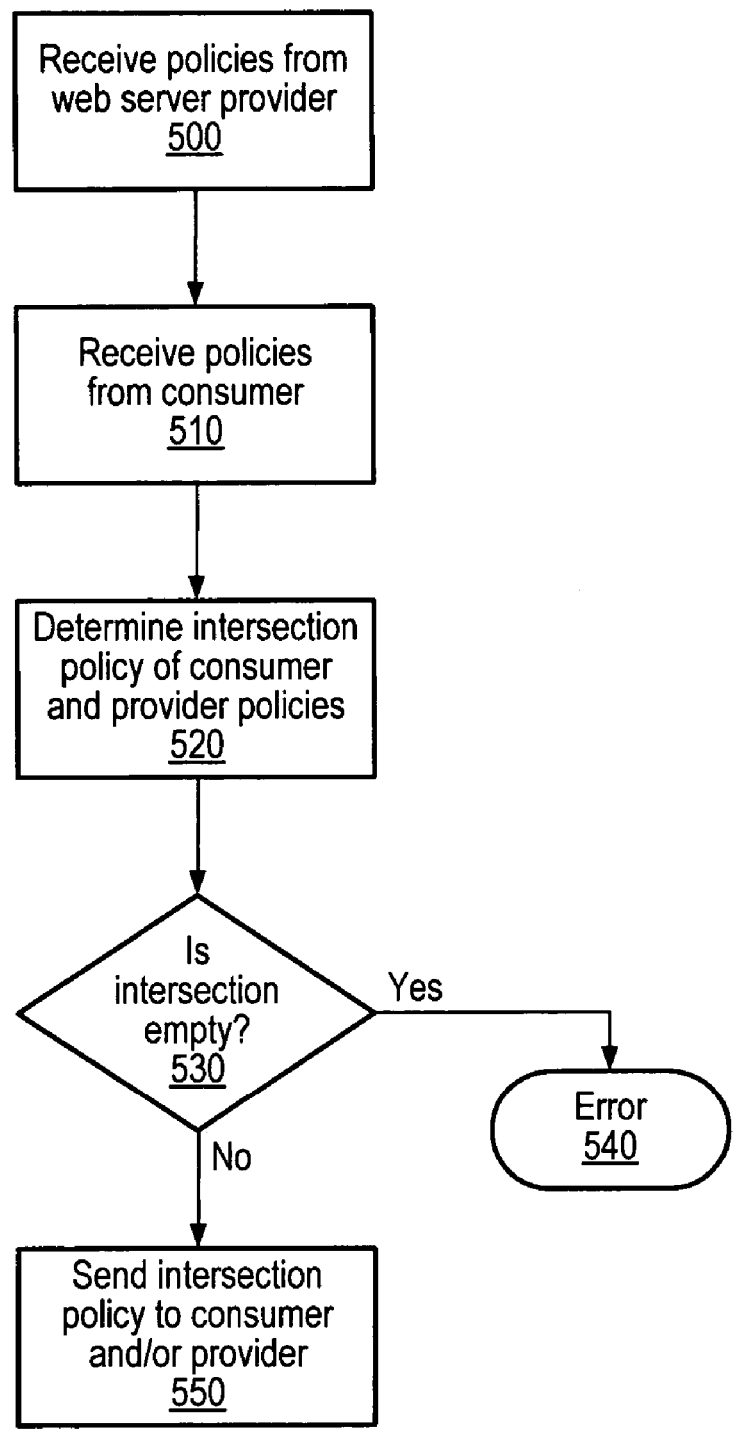
FIG. 5 is flowchart illustrating one embodiment of a method for determining a common policy for communication between a web services consumer and provider.

FIG. 5 is a flowchart illustrating one embodiment of a method for determining a common policy for communication between a web services consumer and provider. As discussed above, web services participants, both consumers and providers, may have policies governing communication and interaction with that participant. When a web services consumer, such as consumer 110, desires to communicate with a web service provider, such as provider 120, or vice versa, a common policy compatible with the specific policies defined for both the consumer and the provider may need to be determined before proper communication may take place, according to some embodiments. As noted above, in some embodiments, the intersection (or cross product) of the two policies may be determined and used as such a common policy for communication.

Thus, as illustrated by block 500, a service broker, such as service broker 200 may receive policies from a web service provider. For instance, provider 120 may register with server broker 200 and send service broker 200 provider policies 410 as part of registering. Additionally, in some embodiments, provider 200 may also send to service broker 200 other information, such as a service description describing the services provided by provider 120. Service broker 200 may also receive service descriptions and policies for other web services providers. In some embodiments, service broker 200 may also broker services to providers other than web services providers.

A web services consumer, such as consumer 110, may desire to use a service provided by a web services provider, such as provider 120, and may communicate with a service broker, such as service broker 200, to locate and obtain the policies for a provider that provides the desired service. In some embodiments, consumer 110 may already know that provider 120 provides the desired service, while in other embodiments, consumer 110 may not know of a particular web services provider capable of providing the desired service. Thus, in some embodiments, consumer 110 may communicate with service broker 200 and request information, such as web services policies, specifically for provider 120. In other embodiments, however, consumer 110 may communicate with service broker 200 and request that service broker locate and provide information, such as web services policies, for a provider capable of providing the desired service.

When communicating with service broker 200, whether requesting information regarding a specific provider, such as provider 120, or not, consumer 110 may, in some embodiments, provide its own policies to service broker 200. Thus, as illustrated by block 510, a service broker may receive policies from a web services consumer, according to one embodiment. Additionally, in some embodiments, consumer 110 may also provide additional information, such as a description of the desired service, to service broker 200 to enable service broker 200 to locate an appropriate service provider. After receiving information, including consumer policies 400, from consumer 110, service broker 200 may analyze or search through the service descriptions and policies received from service providers to determine a provider capable of providing the desired service.

After locating a suitable provider, service broker 200 may, in some embodiments, be configured to analyze policies for the consumer and the provider to determine whether or not they have a compatible set of policies. Thus, as illustrated by block 520, service broker 200 may determine an intersection policy of consumer policies 400 and provider policies 410, according to one embodiment. As discussed above, calculating the intersection of two policies may result in policy compatible with both original policies. Thus, service broker 200 may examiner consumer policies 400 and provider policies 410 in order to calculate intersection policy 420. In some embodiments, service broker 200 may utilize a policy-processing engine, such as policy-processing engine 210, to perform the actual generating of intersection policy 420.

After generating intersection policy 420, service broker 200 may, in some embodiments, examine or evaluate intersection policy 420 to determine whether or not intersection policy 420 contains any satisfiable policy sets (i.e. whether or not the as illustrated by bock 530. As noted above, an empty intersection policy may, in some embodiments, imply that the original policies (that were intersected) are incompatible. In other words, an empty policy contains no satisfiable policy sets. If intersection policy 420 does not contain any satisfiable policy sets, service broker 200 may be configured to perform some sort of error processing, as illustrated by block 540, such as generating and sending an error message to consumer 110, according to some embodiments. When providing an error message to consumer 110, service broker 200 may supply varying amounts of information to consumer 110 regarding the error, according to various embodiments. For instance, in one embodiment, service broker 200 may be configured to inform consumer 110 only that no compatible service provider could be located, while in other embodiments, service broker 200 may be configured to send consumer 110 the web service policies for one or more service providers that provide the desired service, but whose policies may be incompatible with consumer 110's policies.

If intersection policy 420 is not empty (i.e. contains at least one satisfiable policy set), the policies in intersection policy 420 may be compatible with both consumer 110's and provider 120's policies. Service broker 200 may be configured to send intersection 420 to consumer 110 and may, in some embodiments, also send intersection 420 to provider 120, as illustrated by block 550. Service broker 200 may also be configured to allow web service providers to specify whether to receive intersection policies calculated in response to web service consumer requests, according to some embodiments.

In some embodiments, providers may include policies for a number of different interfaces in the policy or service description supplied to service broker 200 and service broker 200 may be configured to calculate the intersection of only those provider policies for the service or interface desired by consumer 110. In other embodiments, however, service broker 200 may rely upon consumer 110 to examiner intersection policy 420 to determine which of the intersection policies apply to the desired interface or service.

Figure 6:
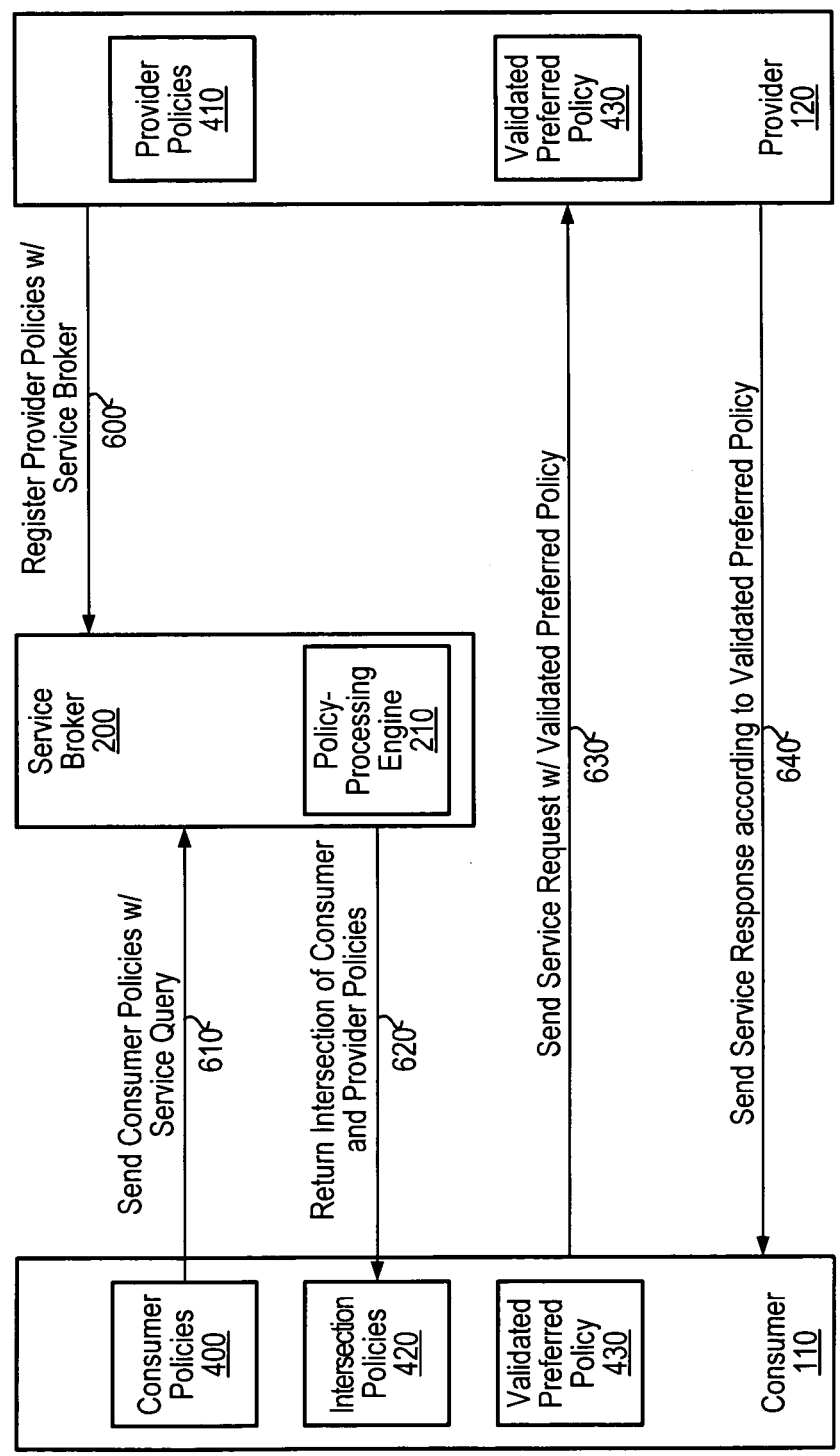
FIG. 6 is a block diagram illustrating, according to one embodiment, the flow of communication between a web services consumer, a web services provider and a service broker.

Referring now to FIG. 6, which is a block diagram that illustrates the flow of information among consumer 110, provider 120 and service broker 200, as described above regarding FIGS. 4 and 5. Provider 120 may be configured to register its policies with service broker 200, as illustrated by arrow 600. As noted above regarding FIG. 3, provider 120 may use a service description language, such as WSDL when registering with service broker 200. Additionally, consumer 110 may desire to utilize a web service provided by provider 120 and thus may send consumer policies 400 to service broker 200, as illustrated by arrow 610. In some embodiments, consumer 110 may send a request to service broker 200 to locate a service that provide a desired web service and may include consumer policies 400 in such a request. In response to receiving consumer policies 400 from consumer 110, service broker 200 may search through all service descriptions is has received, both from provider 120 and other services, for a service that provides the desired web service and whose policies are compatible with consumer policies 400. In some embodiments, service broker 200 may use policy-processing engine 210 (or a combination of policy-intersection engine 212 and policy-reduction engine 218) to determine the intersection of consumer policies 400 and each policy set for each service that provides the desired web service.

In other embodiments, however, consumer 110 may indicate to service broker 200 that it wishes to communicate with provider 120 and thus service broker 200 may only compare consumer policies 400 with provider policies 410 from provider 120. If service broker 200 determines that there is a non-empty intersection of consumer policies 400 and one or more policy sets from provider policies 410 from provider 120, service broker 200 may send the intersection policy or policies to consumer 110, as indicated by arrow 720. If service broker 200 determines that the intersection of consumer policies 400 and provider policies 410 only results in empty intersection policies, service broker 200 may be configured to notify consumer 110 of that fact. In one embodiment, service broker 200 may be configured to only inform consumer 110 that none of consumer policies 440 intersects with provider policies 410, while, in other embodiments, service broker 200 may be configured to send provider 120 policies to consumer 110 as well. Thus, in some embodiments, if there is no policy set in common between consumer 110 and provider 120, consumer 110 may, if service broker sends provider policies 410, be able to verify that service broker 200's assessment is correct; i.e. that there is no non-empty intersection between consumer policies 400 and provider policies 410.

As described above regarding FIG. 4, if consumer 110 receives a valid intersection policy set, such as intersection policies 420, from service broker 200, consumer 110 may validate the returned intersection policies 420 to ensure that the policy sets are compatible with consumer 110's preferred policies and/or vocabulary item values. For instance, consumer 110 may use a policy-processing engine to validate that the intersection policies returned by service broker 200 are compatible with consumer policies 400 (i.e. that there is a non-empty intersection between them). If consumer 110 determines that the intersection policies returned by service broker 200 are not compatible with consumer policies 400, consumer 110 may, in some embodiments, send an error message to service broker 200.

Additionally, consumer 110 may select a preferred policy set, such as validated preferred policy 430 from intersection policies 410. In some embodiments, validated preferred policy 430 may include the same policy sets as intersection policies 420. In other embodiments, however, validated preferred policy 430 may include only a subset of the policy sets in intersection policies 420. For example, consumer 110 may use a policy-processing engine to determine which policy set in intersection policies 420 most closely matches a preferred policy set from consumer policies 400.

After determining validated preferred policy 430, consumer 110 may generate messages according to the validated preferred policy 430 for use in communicating with provider 120. In one embodiment, consumer 110 may send a service request, such as to establish a web services session, to provider 120 and may include validated preferred policy 430 with the message, as indicated by arrow 630 of FIG. 6. Provider 120 may, in response to receiving validated preferred policy 430 from consumer 110, validate that validated preferred policy 430 is compatible with provider policies 410, much as consumer 110 validated intersection policies 420 were compatible with consumer policies 400, described above. Additionally, provider 120 may note any preferred policy sets or vocabulary item values indicated by consumer 110. Provider 120 may thus generate response messages for consumer 110 according to validated preferred policy 430 and may send those messages to consumer 110, as illustrated by arrow 640.

During a web services session between consumer 110 and provider 120, provider 120 may verify that each web services message received from consumer 110 complies with and satisfies validated preferred policy 430, as discussed below regarding FIG. 8.

Figure 7:
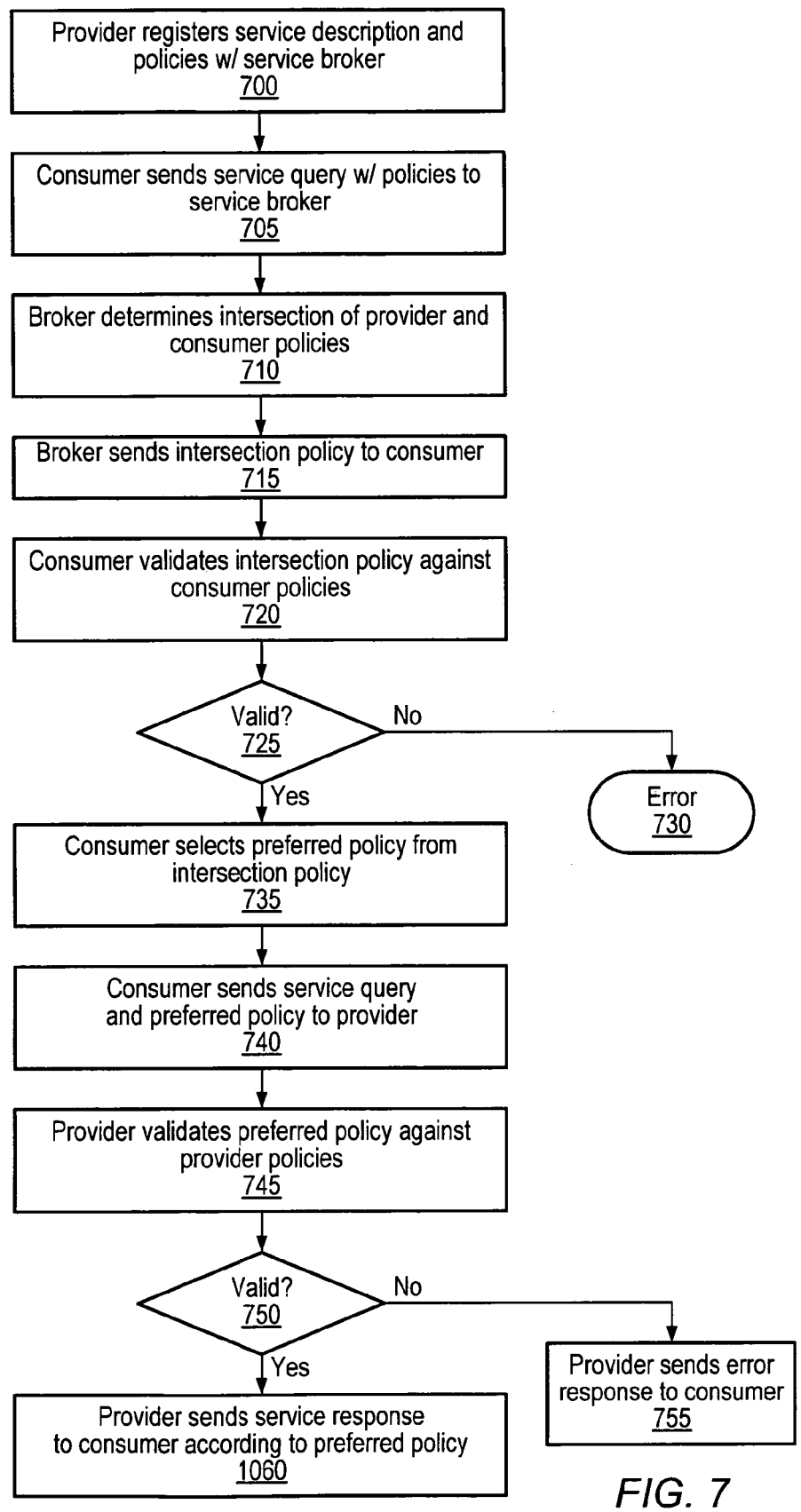
FIG. 7 is a flowchart illustrating one embodiment of a method for a web services consumer to obtain policies for a web services provider from a service broker.

FIG. 7 is a flowchart illustrating one embodiment of a method for a web services consumer to obtain policies for a web services provider from a service broker. As described above regarding FIG. 6, a web services consumer may communicate with a service broker and request information, including web services policies, regarding a web services provider capable of providing a desired service. Also as described above, a web services provider, such a provider 120, may register a service description and web services policies with service broker 200, as illustrated by block 700, according to one embodiment. Service broker 200 may also receive service descriptions and/or policies from other service providers, both web services providers and others, and thus may maintain a set or library of such service descriptions and/or policies.

In order to locate a web services provider both capable of providing a desired service and that has policies compatible with its own policies, consumer 110 may send a service query and consumer policies 400 to service broker 200, as illustrated by block 705. In response to receiving the service query and policies from consumer 110, service broker 200 may search through the service descriptions and policies received from providers to locate one or more providers capable of providing the desired service. Once service broker 200 has locate one or more such providers, service broker 200 may determine intersections for consumer policies 400 with the policies for each of the located providers, such as provider policies 410 for provider 120, as illustrated by block 710.

If service broker 200 determines a valid intersection policy, such as intersection policies 420, service broker 200 may, in some embodiments, send the intersection policy to consumer 110, as illustrated by block 715. In some embodiments, service broker 200 may have located more than one provider that is capable of providing the desired service and whose policies are compatible with consumer 110's policies and may send more than one intersection policy to consumer 110. After receiving intersection policies 420, consumer 110 may validate intersection policies 420, as illustrated by block 720, to ensure that they are truly compatible with its own policies and, in some embodiments, to determine a preferred policy. As noted above, consumer 110 may utilize policy processing software, such as policy-processing engine 210, to perform the validation of intersection policies 420. If intersection policies 420 are not validated successfully, consumer 100 may be configured to perform some sort of error processing, as illustrated by block 730. If, however, consumer 110 determines that intersection policies 420 is valid, as illustrated by the positive exit from decision block 725, consumer 110 may examine intersection policies 420 and select a preferred policy, such as validated preferred policy 430, as illustrated by block 735. For instance, if consumer 110 receives intersection policies for more than one provider or if the intersection policies contain more than one compatible policy for a provider, consumer 110 may analyze the intersection policies to determine a policy from intersection policies 420 that most closely matches consumer 100's preferred policies. If however, intersection policies 420 includes only a single set of compatible policies, validated preferred policy 430 may be the same as intersection policies 420, according to one embodiment. Additionally, in some embodiments, selecting a preferred policy from an intersection policy may include selecting preferred values for each vocabulary item in a selected preferred policy.

Consumer 110, after receiving and validating intersection policies 420 and selecting a preferred policy, may generate messages, such as service request messages, for provider 120, according to the selected policy, such as validated preferred policy 430. In some embodiments, consumer 110 may be configured to send both a message, such as a service request message and validated preferred policy 430 to provider 120, as illustrated by block 740. In response to receiving a message and policies from consumer 110, provider 120 may, in some embodiments, validate the policies against its own policies in much the same way as consumer 110, as illustrated by block 745. If provider 120 determines that validated preferred policy 430 is not valid, provider 120 may send an error response to consumer 110, as illustrated by block 755. If, however, provider 120 determines that validated preferred policy 430 is valid, as illustrated by the positive exit from decision block 750, provider 120 may, in one embodiment, send a service response message, generated according to validated preferred policy 430, to consumer 110, as illustrated by block 760.

Both consumer 110 and provider 120 may, in some embodiments, validate each message sent from the other according to validated preferred policy 430.

Figure 8:
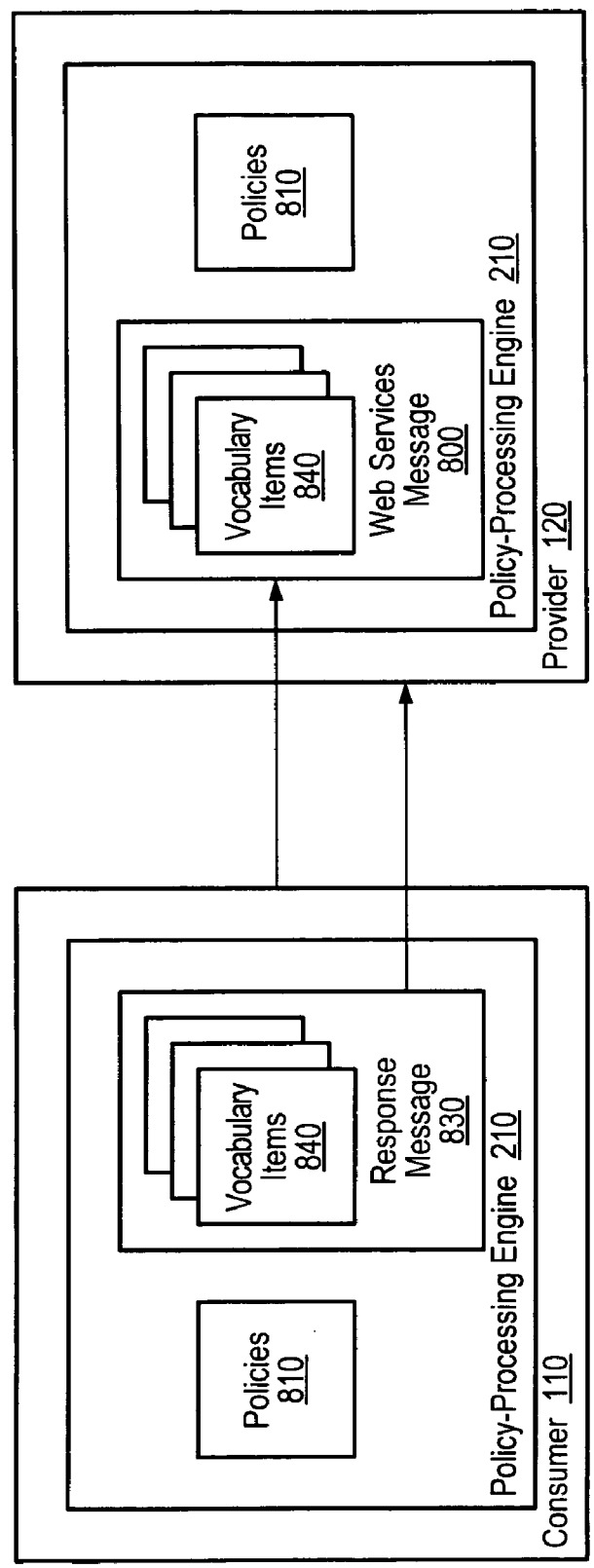
FIG. 8 is a block diagram illustrating the validation of web services messages, in one embodiment.

Referring now to FIG. 8, which is a block diagram illustrating the validation of a received web services message against a set of policies. After having determined and negotiated a set of policies, such as policies 810, for communication between consumer 110 and provider 120, consumer 110 may send one or more web services messages, such as service requests, to provider 120 as part of a web services session. In some embodiments, provider 120 may validate that each received message, such as web services message 800, complies with the agreed upon policies, such as policies 810. As described above, policies 810 may represent an intersection policy of the consumer's and provider's individual policies. As illustrated in FIG. 8, provider 120 may utilize a policy-processing engine, such as policy-processing engine 210 or vocabulary item verification engine 216 when validating a message by verifying it against a policy set. Thus, in some embodiments, policy-processing engine 210 may compare the received message to each policy set in policies 810 to determine whether the web services message 800 is compatible with at least one policy set from policies 810. For instance, policy-processing engine 210 may verify vocabulary items 840 in web services message 800 against policies 810.

When validating vocabulary items 840 from web services message 800 against policies 810, policy-processing engine 210 may, in some embodiments, compare each of the defined policy constraints for each policy set in policies 810 against vocabulary items 840. If vocabulary items 840 are successfully verified against all policy constraints in at least one policy set in policies 810, vocabulary items 840, and therefore web services message 800, have been successfully verified against policies 810. Not only may verifying vocabulary items 840 against policies 810 include verifying that vocabulary items 840 includes all required vocabulary items specified by the constraints in the policy sets of policies 810, it also may include verifying that vocabulary items 840 does not include any prohibited vocabulary items defined in policies 810, according to some embodiments. Additionally, any additional requirements specified in a policy sets layer of policies 810 may also be verified with respect to web services message 800, according to one embodiment.

According to some embodiments, validating vocabulary items 840 may involve verifying specific constraints from policies 810 against all items in vocabulary items 840. For instance, a particular constraint may be verified by dereferencing all vocabulary items references in the constraint against vocabulary items 840 and evaluating the constraint using semantics specified in the policy specification language, such as the XACML 2.0 Core Specification, described above.

If vocabulary items 840 do not comply with policies 810, provider 120 may reject web services message 800 and may, in some embodiments, send and error message describing the non-compliant vocabulary items and the corresponding policy constraints from policies 810 to consumer 110.

Furthermore, a web services consumer, such as consumer 110 may verify that response messages from web services provider, such as provider 120. Thus, consumer 110 may, in some embodiments, verify that vocabulary items 840 in response message 830 are consistent with policies 810. In some embodiments, consumer 110 may utilize policy-processing engine 210 when validating response messages from provider 120.

Figure 9:
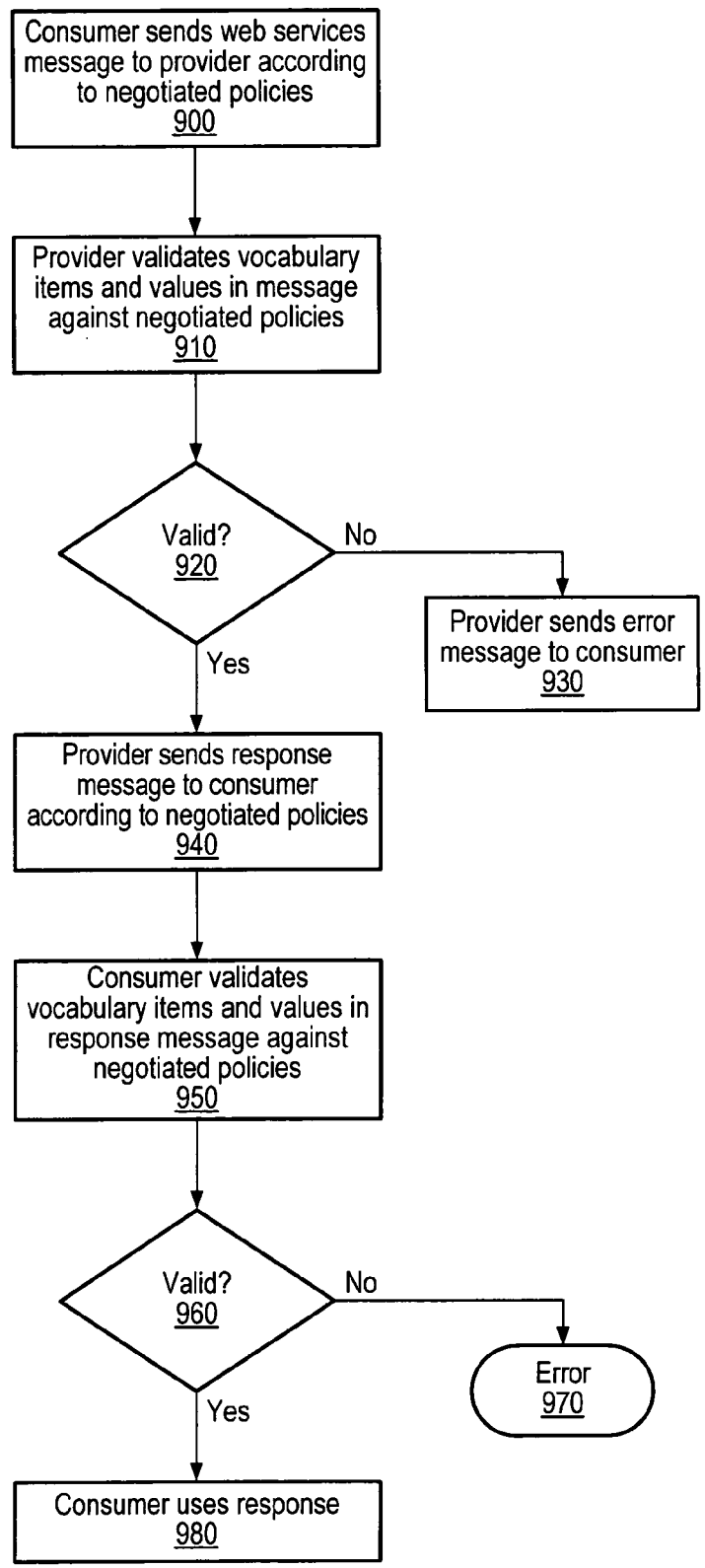
FIG. 9 is a flowchart illustrating one embodiment of a method for validating web services messages according to a relevant web services policy.

FIG. 9 is a flowchart illustrating one embodiment of a method for validating web services messages according to a relevant web services policy. As described above regarding FIG. 8, web services consumer and providers may be configured, in some embodiments to verify received web services messages against a relevant web services policy and may utilize policy processing software, such as policy-processing engine 210 or vocabulary item verification engine 216, to perform the actual message verification. For instance, consumer 110 may send a web services message to provider 120 according to a policy negotiated between consumer 110 and provider 120, as illustrated by block 900. As described above regarding FIGS. 4, 5, and 6, consumer 110 and provider 120 may have negotiated, such as through service broker 200, a set of policies compatible with policies for both consumer 110 and provider 120. Consumer 110 may generate web services message according to the negotiated policies, such as policies 810, and send those messages to provider 120 as part of a web services session.

After receive a web services message, such as web services message 800, from consumer 110, provider 120 may, in some embodiments, be configured to validate the message by verifying the vocabulary items and values in web services message 800 against policies 810, as illustrated by block 910. As described above, provider 120 may utilize policy-processing engine 210 or vocabulary item verification engine 216 for verifying the received message according to policies 810 and policy-processing engine 210 may compare the vocabulary items and vocabulary items values against each policy constraint in policies 810 in order to determine whether or not received web services message 800 is valid according to policies 810, as illustrated by block 920.

If policy-processing engine 210 determines that web services message 800 is not valid according to policies 810, provider 120 may send an error message to consumer 110, as illustrated by block 930. In one embodiment, provider 120 may be configured to only inform consumer 110 that message 800 is invalid. In other embodiments, provider 120 may be configured to also send information identifying the relevant vocabulary items and/or values from message 800 that did not satisfy policies 810 and the relevant policy constraints from policies 810. If, however, web services message 800 is found to be valid according to policies 810, provider 120 may generate response message, such as response message 830, to web services message 800 according to policies 810 and send the response to consumer 110, as illustrated by block 940.

After receiving a web services response message, such as response message 830, from provider 120, consumer 110 may, in some embodiments, be configured to validate the response message against policies 810. Thus, consumer 110 may validate the vocabulary items and values in response message 830 against policies 810, as indicated by block 950. Consumer 110 may validate web services response messages from provider 120 in the same manner that provider 120 validated web services message 800, as described above. For instance, in some embodiments, consumer 110 may utilize policy processing software, such as policy-processing engine 210 or vocabulary item verification engine 216 to perform the validation of response message 830 and may supply both response message 830 and policies 810 to policy-processing engine 210.

If policy-processing engine 210 (or vocabulary item verification engine 216) and/or consumer 110 determines that response message 810 is not valid, consumer 110 may be configured to perform some sort of error processing as illustrated by block 970, such as sending an error message to provider 120 identifying to provider 120 the relevant vocabulary items, values and the corresponding policy constraints causing response message 830 to be invalid. In other embodiments, however, consumer 110 may only inform provider 120 that response message 830 was invalid without indicating the specific reasons why. If, response message 830 is determined to be valid, as illustrated by the positive exit from decision block 960, consumer 110 may use the information in response message 830 accordingly, as illustrated by block 980. The exact use of the information in response message 830 depends upon the specific nature of the web service being provided by provider 120 and the specific service request and response messages being sent between consumer 110 and provider 120.

Figure 10:
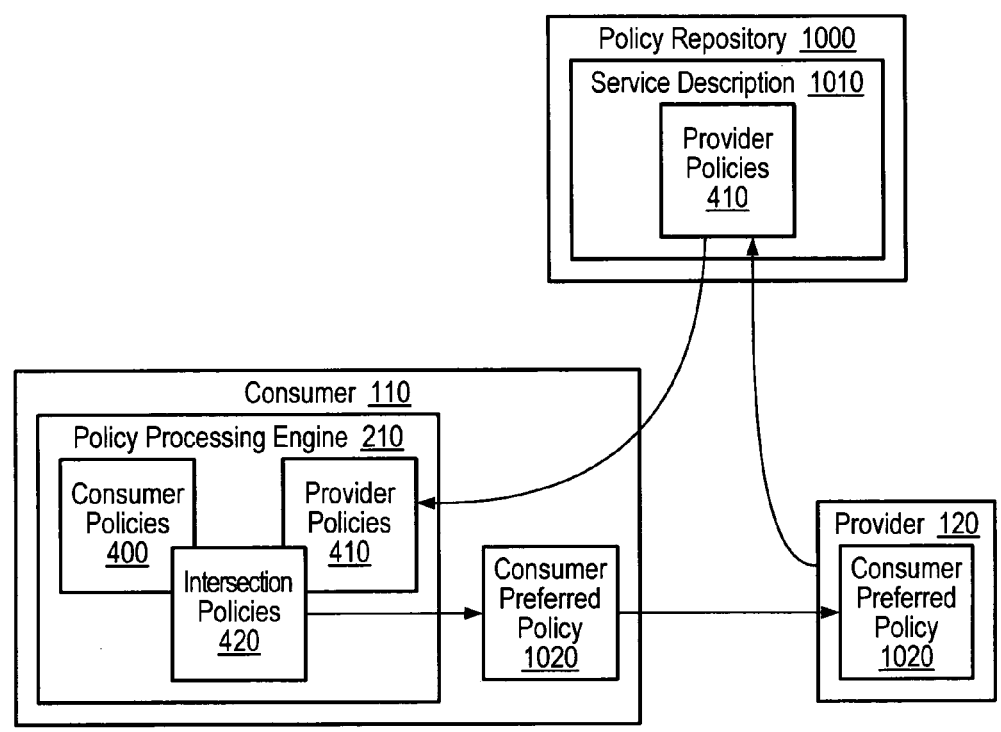
FIG. 10 is a block diagram illustrating the use of a policy repository for determining a web services policy for communication between a web services consumer and provider, in one embodiment.

While the above discussions regarding FIGS. 4, 5 and 6 refer to a service broker determining the intersection of the policies for a web services consumer and web services provider, in other embodiments, a web services consumer, such as consumer 110, may determine such an intersection policy. For example, as illustrated in FIG. 10, a web services consumer may obtain the policies for a web services provider from a repository of web services policies and/or service descriptions for web services providers. Thus, consumer 110 may, in some embodiments, be configured to access policy repository 1000 to obtain provider policies 410 for provider 120. Provider 120 may have previously published service description 1010 including provider policies 410 on policy repository 1000, according to one embodiment. Consumer 110 may access policy repository 1000 in any of numerous manners well known in the art and not described in detail herein.

After obtaining provider policies 410 from policy repository 1000, consumer 110 may compare provider policies 410 with its own consumer policies 400 to determine if there is an common policy set compatible with both provider policies 410 and consumer policies 400. For instance, in one embodiment, consumer 110 may utilize policy-processing engine 210 to calculate an intersection, such as intersection policies 420, for consumer policies 400 and provider policies 410. If intersection policies 420 is not empty (i.e. contains at least one satisfiable policy set), consumer 110 may then communicate with provider 120 according to one or more policy sets in intersection policies 420. Additionally, if intersection policies 420 includes more than one policy set, consumer 110 may select a preferred policy set, such as consumer preferred policy 1020 with which to communicate with provider 120. As described above regarding FIG. 6, consumer 110 may select a policy set from intersection policies 420 that most closely matches a preferred set of vocabulary item values (or policy constraint values) for consumer 110.

When communicating with provider 120, consumer 110 may send consumer preferred policy 1020 to provider 120, according to one embodiment. For instance, consumer 110 may send consumer preferred policy 1020 to provider 120 as part of establishing a web services session with provider 120. Alternatively, consumer 110 may send consumer preferred policy 1020 to provider 120 in response to a policy request message from provider 120. As described above regarding FIG. 8, both consumer 110 and provider 120 may validate messages from the other according to consumer preferred policy 1020.

Figure 11:
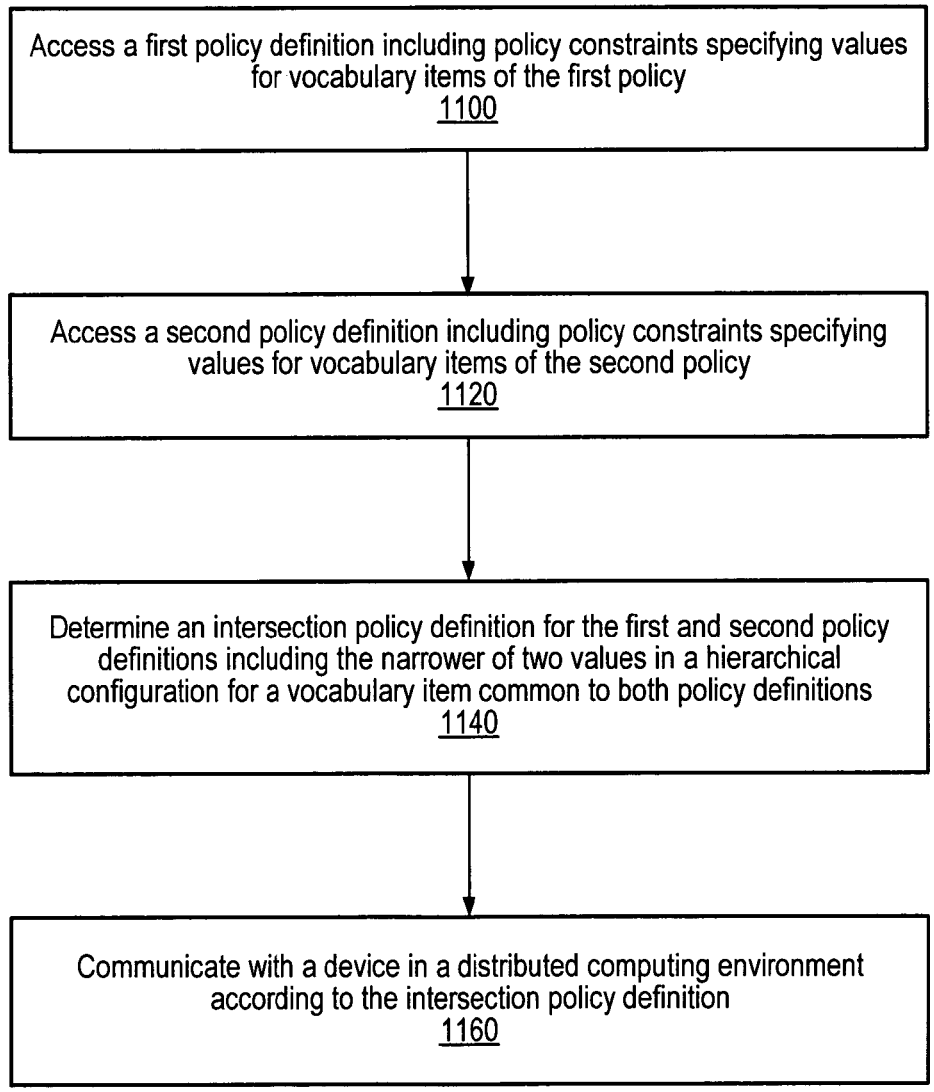
FIG. 11 is a flowchart illustrating one embodiment of a method for determining the intersection of two policies including hierarchical constraint values.

As discussed above, policy definitions may specify hierarchical configurations of vocabulary items or constraint values for vocabulary items. FIG. 11 is a flowchart illustrating a method including determining an intersection policy for two policies including values in a hierarchical arrangement. For instance, in some embodiments, the values specified in a policy constraint may be associated with a semantic hierarchy at the policy sets layer, the policy constraints layer, or at the vocabulary specification layer. The intersection of two coincident equality policy constraints that specify values that are not equal, but are in the same semantic hierarchy may result in an equality constraint in which the vocabulary item is the same and the literal value may be the union of the semantics of the two input values (i.e. the descendant, or most specific, value). Additionally, if the two original values are specified as having equivalent semantics, the intersection of the two constraints may be either one of the two original constraints. Furthermore, if the values are not in the same semantic hierarchy, then the two policy constraints may not be compatible.

For example, a policy-processing engine, such as policy-processing engine 210 may access a first policy definition that includes policy constraints specifying values for vocabulary items of the policy, as illustrated by block 1100. In one embodiment, such a policy definition may include policy constraints specifying acceptable values for vocabulary items for the policy. In order to determine an intersection, policy-processing engine 210 may also access a second policy definition also including policy constraints specifying acceptable value for vocabulary items for that policy, as illustrated by block 1120. In some embodiments, constraints from each policy definition may specify values that are not syntactically equal, but that are semantically equivalent, or where one value is a semantic sub-class of the other value. For example, as discussed above, one policy may include a constraint specifying an action movie, while the other policy may include a constraint specifying a James Bond movie. The two values may be associated with a semantic hierarchy definition that defines a James Bond movie as an action movie. Thus, in such an example, the constraint specifying the James Bond movie is narrower and included in the range of movies specified by the action move constraint. Said another way, the James Bond vocabulary item value inherits semantics from the action movie value.

After accessing both policy definitions, policy-processing engine 210 may, in some embodiments, determine an intersection policy definition for the two policies, as illustrated by block 1140, including the narrower of two values in a hierarchical configuration for a vocabulary item having values in the two policies that are semantically equivalent or where one is a sub-class of the other. For instance, an intersection of two policies including the movie constraints from the example above may, in some embodiments, include a policy constraint specifying a James Bond movie. Since, in the example given above, the two movie constraints are configured in a semantic hierarchy that defines a James Bond movie as a subset or inheritor of an action movie, a vocabulary instance that includes a James Bond movie may satisfy both original policies. Thus, an intersection of two such policies may include a constraint specifying only a James Bond movie.

Finally, the intersection policy determined by policy-processing engine 210 may, in one embodiment, be used to communicate with a device in a distributed computing environment, as illustrated by block 1160. For instance, policy-processing engine 210 may have generated the intersection policy in response to a request from a web-services consumer and the consumer may communicate with a web-services provider according to the intersection policy generated by policy-processing engine 210, as described above.

According to some embodiments of the present invention, policy constraints may be specified using a policy constraint language. Such policy constraint language may, in some embodiment, be implemented as an extension to an existing policy definition language. For example, in one embodiment, a policy constraint language, such as WS-PolicyContraints may be an extension to the existing XACML policy definition language. The following sections describe particular embodiments of a policy constraint language using examples based on the WS-PolicyConstraint language implemented as an extension to the XACML policy definition language.

For instance, a policy constraint may be expressed, according to some embodiments, as an XACML predicate (i.e. by using an <Apply> element) over one or more vocabulary items or literal values contained in a vocabulary instance. A vocabulary item in a policy constraint may be referenced using either a XACML <AttributeSelector> or a XACML <AttributeDesignator> element.

One example of a schema specified using the WS-Policy-Constraints language, according to one embodiment, is defined below:

```
<xs:element name="Expression" type="xacml:ExpressionType"
    abstract="true"/>
<xs:complexType name="ExpressionType" abstract="true"/>
<xs:element name="AttributeSelector"
    type="xacml:AttributeSelectorType"
    substitutionGroup="xacml:Expression"/>
<xs:complexType name="AttributeSelectorType">
    <xs:complexContent>
        <xs:extension base="xacml:ExpressionType">
            <xs:attribute name="RequestContextPath" type="xs:string"
    use="required"/>
            <xs:attribute name="DataType" type="xs:anyURI"
    use="required"/>
            <xs:attribute name="MustBePresent" type="xs:boolean"
    use="optional" default="false"/>
        </xs:extension>
    </xs:complexContent>
</xs:complexType>
<xs:element name="ResourceAttributeDesignator"
    type="xacml:AttributeDesignatorType"
    substitutionGroup="xacml:Expression"/>
<xs:element name="ActionAttributeDesignator"
    type="xacml:AttributeDesignatorType"
    substitutionGroup="xacml:Expression"/>
<xs:element name="EnvironmentAttributeDesignator"
    type="xacml:AttributeDesignatorType"
    substitutionGroup="xacml:Expression"/>
<xs:complexType name="AttributeDesignatorType">
    <xs:complexContent>
        <xs:extension base="xacml:ExpressionType">
            <xs:attribute name="AttributeId" type="xs:anyURI"
    use="required"/>
            <xs:attribute name="DataType" type="xs:anyURI"
    use="required"/>
            <xs:attribute name="Issuer" type="xs:string"
    use="optional"/>
            <xs:attribute name="MustBePresent" type="xs:boolean"
    use="optional" default="false"/>
        </xs:extension>
    </xs:complexContent>
</xs:complexType>
<xs:element name="SubjectAttributeDesignator"
    type="xacml:SubjectAttributeDesignatorType"
    substitutionGroup="xacml:Expression"/>
<xs:complexType name="SubjectAttributeDesignatorType">
    <xs:complexContent>
        <xs:extension base="xacml:AttributeDesignatorType">
            <xs:attribute name="SubjectCategory" type="xs:anyURI"
    use="optional" default="urn:oasis:names:tc:xacml:1.0:subject-
    category:access-subject"/>
        </xs:extension>
    </xs:complexContent>
</xs:complexType>
```

Thus, a particular vocabulary item may be defined using an <AttributeSelector> element. For example, an <AttributeSelector> reference constructed using the above language may read:

```
<AttributeSelector
    RequestContextPath="//Signature/SignatureMethod@Algorithm/f
n:base-uri( )"
    DataType="&type;anyURI"/>
```

This <AttributeSelector> references a vocabulary item named Algorithm that is an XML attribute in an instance of a schema that describes a digital signature. The RequestContextPath in the <AttributeSelector> may be an XML attribute that contains an XPath expression that selects the Algorithm value as a URI, according to one embodiment. Since there could conceivably be more than one instance of any given vocabulary item in a vocabulary instance, the set of all values that are selected by the RequestContextPath may be returned as a bag, which may be an unordered collection of values that may contain duplicates. If the vocabulary instance contains no items that match the XPath selection criteria, then the bag returned may be empty.

As another example, a <ResourceAttributeDesignator> constructed using the above language might read::

```
<ResourceAttributeDesignator
    AttributeId="data-rate"
    DataType="&type;integer"/>
```

This <ResourceAttributeDesignator> references a vocabulary item named data-rate expressed as an XACML Resource Attribute in a vocabulary instance. The identifier for the Attribute is "data-rate" (such identifiers may be URIs or URLs with specific namespaces), and the data type is specified as an "integer". Again, since there could conceivably be more than one instance of any given vocabulary item in a vocabulary instance, the set of all values in all Resource Attributes that match this identity and data type may be returned as a bag of values. If the vocabulary instance contains no Attributes that match both of the <AttributeDesignator> XML attributes, then an empty bag may be returned.

Any XACML Attribute may have an "Issuer" XML attribute that identifies the issuer of the Attribute; there is no default value for "Issuer". XACML Subject Attributes may also have a "SubjectCategory" XML attribute that explicitly identifies the type of subject (user, machine, application, receiver, etc.); the default "SubjectCategory" value may be "&category;access-user", meaning the human user on whose behalf the access is being made, in some embodiments.

When defining literal values in policy constraints, the literal value may be expressed using a XACML <AttributeValue> instance. For example:

```
<xs:element name="AttributeValue" type="xacml:AttributeValueType"
    substitutionGroup="xacml:Expression"/>
<xs:complexType name="AttributeValueType" mixed="true">
    <xs:complexContent mixed="true">
        <xs:extension base="xacml:ExpressionType">
            <xs:sequence>
                <xs:any namespace="##any" processContents="lax"
    minOccurs="0" maxOccurs="unbounded"/>
            </xs:sequence>
```

-continued

```
      <xs:attribute name="DataType" type="xs:anyURI"
   use="required"/>
      <xs:anyAttribute namespace="##any"
processContents="lax"/>
    </xs:extension>
  </xs:complexContent>
</xs:complexType>
```

According to some embodiments, a policy constraint may be expressed using a XACML <Apply> element, optionally with the additional of a "Preference" XML attribute. For example:

```
<xs:element name="Apply" type="xacml:ApplyType"
   substitutionGroup="xacml:Expression"/>
<xs:complexType name="ApplyType">
  <xs:complexContent>
    <xs:extension base="xacml:ExpressionType">
      <xs:sequence>
        <xs:element ref="xacml:Expression" minOccurs="0"
maxOccurs="unbounded"/>
      </xs:sequence>
      <xs:attribute name="FunctionId" type="xs:anyURI"
   use="required"/>
      <xs:attribute name="Preference" type="xs:string"
   use="optional"/>
    </xs:extension>
  </xs:complexContent>
</xs:complexType>
```

In some embodiments, only a single vocabulary item may be referenced in a single policy constraint. However, in other embodiments, a policy constraint definition may reference more than one vocabulary item. However, in embodiments where multiple vocabulary items may be referenced by a single policy constraint definition, policy processing software, such as policy-processing engine 210, may need to handle circular references. For instance, one policy constraint may specify that vocabulary item A must be greater than vocabulary item B, a second policy constraint may specify that vocabulary item B must be greater than vocabulary item C, and third policy constraint may specify that vocabulary item C must be greater than vocabulary item A (e.g. A>B, B>C, C>A).

As noted above, a policy constraint may include a "Preference" XML attribute, according to some embodiments. The values for such a "Preference" attribute may, in some embodiments, be either "greater" or "lesser". Such preference values may indicate which of the possible values for the policy constraint are preferred. Thus, a "Preference" value of "greater" may indicate that greater or later (for times and dates) values are preferred. For example, if a policy constraint specifies a range from 0-64 as a value for a particular vocabulary item and includes a greater "Preference" attribute, values closer to 64 are preferred. Similarly, "Preference" values of "lesser" may indicate that smaller or earlier values are preferred. Thus, in the above 0-64 example, values closer to 0 would be preferred. Preference values may be used with any DataType for which a suitable preference ordering has been defined.

In some embodiments, multiple <Apply> instances may not be nested in a policy set definition. However, in other embodiments, multiple <Apply> instances may be nested in order to convert a bag to a single value when required by the policy constraint function or to limit the scope of a set of policy constraints. In other words, a policy constraint may be specified using one of the following language elements: an <AttributeValue>, an <AttributeSelector>, an <AttributeDesignator> type. Additionally, a policy constraint may also be specified using an <Apply> element that includes a FunctionId value corresponding to a XACML 'one-and-only' function and a single expression element that is an <AttributeSelector> or one of the <AttributeDesignator> types, in one embodiment. Furthermore, in some embodiments, a policy constraint may be specified using an <Apply> element with a FunctionId value equal to "[namespace:]limit-scope." A "limit-scope" function may be used to group policy constraints that need to all be satisfied by a single element, as is described below in more detail. Such <Apply> elements may be arbitrarily nested in some embodiments. All constraints specified under a "[namespace:]limit-scope" function may be considered to be individual constraints under a single logical AND operator at the policy set level. According to some embodiments, the FunctionId attribute for an <Apply> element may be limited to a certain set of FunctionId attributes, such as those listed in Table 1 below.

An example of a policy constraint specified as described above, may be described in English as: "There must be a single data-rate vocabulary item that must be greater than or equal to 64000". The same policy constraint may be specified using the WS-PolicyConstraints language as:

```
<Apply FunctionId="&function;integer-greater-than-or-equal">
   <Apply FunctionId="&function;integer-one-and-only">
      <ResourceAttributeDesignator
        AttributeId="data-rate"
        DataType="&type;integer"/>
   </Apply>
   <AttributeValue
     DataType="&type;integer">64000</AttributeValue>
</Apply>
``` where "data-rate" has been defined as a resource attribute of type integer.

Another example policy constraint in English may be: "Only one XML Digital Signature may be present and it must use the RSA-SHA1 signature method." This policy constraint may be defined using the WS-PolicyConstraints language as:

```
<Apply FunctionId="function;anyURI-equal">
   <Apply FunctionId="&function;anyURI-one-and-only">
      <AttributeSelector
        RequestContextPath=
"//Signature/SignatureMethod@Algorithm/fn:base-uri( )"
        DataType="&type;anyURI"/>
   </Apply>
   <AttributeValue
     DataType="&type;anyURI">http://www.w3.org/2000/09/xmldsig#rsa-
     sha1</AttributeValue>
</Apply>
```

As a third example, a policy constraint that read in English as: "At least one of the credit card types accepted must be VISA" may be specified using the WS-PolicyConstraints language as:

```
<Apply FunctionId="&function;string-is-in">
   <AttributeValue DataType="&type;string">VISA</AttributeValue>
   <ResourceAttributeDesignator
     AttributeId="credit-card-type"
```

```
    DataType="&type;string"/>
</Apply>
``` where "credit-card-type" has been defined as a resource attribute of type "string".

A policy constraint definition may indicate whether or not a particular vocabulary item is required. Additionally, a policy constraint definition may also indicate whether a particular vocabulary item must not be present (i.e. is prohibited). Furthermore, a policy constraint definition may also indicate either specific values for a vocabulary item or that a vocabulary item may have any value (i.e. is an unconstrained vocabulary item).

Policy sets including policy constraints specifying either prohibited or unconstrained vocabulary items may, in some embodiments, require the inclusion in the policy set definition of functions that allow intersections for the prohibited or unconstrained vocabulary items.

For instance, a policy set may include a function with semantics indicating that the vocabulary item argument must be present. Such a function may be referred to as a "must-be-present" function. Please note that in some embodiments, such a function may have a unique identifier, typically constructed by appending the function name to an appropriate namespace identifier. According to some embodiments, the "must-be-present" function may take an <AttributeSelector> or an <AttributeDescriptor> as an argument and may return a Boolean result. The result may be "true" if the bag containing the values of the specified <AttributeSelector> or <AttributeDescriptor> contains at least one value. The result may be "false" otherwise.

Additionally, a "must-be-present" function may take an <AttributeDescriptor> or an <AttributeValue> with a string datatype, such as "&xml;string", as an argument and may return a Boolean result. The <AttributeValue> string may be interpreted as an XPath expression, in one embodiment. The result of the "must-be-present" function may be "true" if the bag containing the values of the specified <AttributeDescriptor> contains at least one value. Alternatively, the result may be true if a nodeset representing the XPath expression contains at least one value. Otherwise, the result may be "false".

The "must-be-present" function may be equivalent to applying a "bag-size" function to an <AttributeDescriptor> and comparing the result using a "greater-than-or-equal" function to an integer value "1."

Another function that may be included in Policy sets may have semantics indicating that a vocabulary item argument must not be present. Such a function may be referred to as a "must-not-be-present" function. . A "must-not-be-present" function may take an <AttributeDescriptor> or an <AttributeValue> with a string datatype, such as a "&xml;string" datatype, as its argument. A "must-not-be-present" function may return a Boolean result. In some embodiments, the <AttributeValue> string may be interpreted as an XPath expression. The result from a "must-not-be-present" function may be "true" if the bag containing the values of the specified <AttributeDescriptor> or the node set representing the XPath expression contains no values (i.e. is an empty bag or set). Otherwise, the result may be "false". In some embodiments, a "must-not-be-present" function may be equivalent to applying a "bag-size" function to an <AttributeDescriptor>and comparing the result using an "equal" function to the integer value "0".

In some embodiments, a policy set may include a function to group policy constraints that need to all be satisfied by a single element, such as in an XML schema instance. Such a function may be referred to as a "limit-scope" function. For instance, a "limit-scope" function may take two or more parameters, where the first parameter is an <AttributeValue> with a string data type and the remaining parameters are policy constraints. As with the other functions described above, a "limit-scope" function may return a Boolean result. According to some embodiments, an <AttributeValue> parameter to a "limit-scope" function may be interpreted as an XPath expression. The result of a "limit-scope" function may be "true" if the policy constraints are all "true" when applied to at least one single node in the node set selected by the <AttributeValue>'s XPath expression. That is, all policy constraints may be satisfied by the same node, although there may be multiple such nodes where all constraints are satisfied, according to certain embodiments.

Instances of a "limit-scope" function may be treated, for purposes of policy intersections, as if all the policy constraints were individual constraints specified separately without the "limit-scope" function. Thus, a "limit-scope" function may be nested arbitrarily deeply, but all constraints may be treated as if they were specified at the top-most policy set constraint level. For example, a "limit-scope" function may be defined, in a non-normative manner, as:

```
<Apply FunctionId="[namespace:]limit-scope">
    <AttributeValue Datatype="&xml;string">/security/key-info</AttributeValue>
    <Apply FunctionId="&function;integer-equal">
        <AttributeSelector ElementId="/key-length" Datatype="&xml;integer">
        <AttributeValue Datatype="&xml;integer">96</AttributeValue>
    </Apply>
    <Apply FunctionId="&function;string-equal">
        <AttributeSelector ElementId="/algorithm" Datatype="&xml;string">
        <AttributeValue Datatype="&xml;string">DES-CBC</AttributeValue>
    </Apply>
</Apply>
```

The "limit-scope" function in the above example may only return true if there is at least one "/security/key-info" element that has a "key-length" child with value 96 and an "algorithm" child with value "DES-CBC". Additionally, the "limit-scope" function in the above example specifies two policy constraints. When computing a policy intersection including the above "limit-scope" function, the two policy constraints may be considered as if they were individual policy constraints enclosed with an AND operator at the policy set level.

Another function that may be included in policy sets is an "ipAddress-match" function. Such as function may be used to specify a range of IP address values that may optionally be qualified by port-ranges. According to some embodiments, an "ipAddress-match" function may take two parameters, where the first parameter that is an <AttributeValue> of type "&xml;string" and the second parameter is an <AttributeSelector> or <AttributeDescriptor> with datatype "&datatype;ipAddress". Additionally, an "ipAddress-match" function may return "true" if IP addresses and ports (if included) specified by the <AttributeSelector> or <AttributeDescriptor> are a subset of IP addresses specified by the <AttributeValue>. In some embodiments, an "ipAddress-match" function may be used rather than the XACML ipAddress-regexp-match function because it is very difficult to specify ranges of IP addresses and port using regular expressions, and because taking the intersection of two such regular expressions may not be well-defined.

Table 1, below, includes a set of possible policy constraint functions that may be specified in policy set definitions and that may be supported by policy processing software, such as a policy-processing engine, as described herein. Table 1 also describes how the intersection of any two policy constraints may be computed, according to some embodiments. By way of example, the "first constraint", "second constraint" and "replacement constraint" columns of Table 1 below may represent shorthand versions of an XACML <Apply> element. For instance, the text before an open parenthesis (e.g. "type-equal" in the first row of Table 1) may represent an <Apply> element's FunctionId attribute value. Additionally, the "type-" portion may represent any of the type-specific parts of standard XACML function identifiers. The letters in Table 1, (e.g. "a", "b", and "c" in the first row of Table 1) may represent XACML <AttributeDesignator>, <AttributeSelector> or <AttributeValue> elements. For example, where a constraint FunctionId takes a single value rather than a bag as an argument when an <AttributeDesignator> or <AttributeSelector> is used, the <AttributeDesignator> or <AttributeSelector> may be enclosed in an inner <Apply> element having as its FunctionId an appropriate "type-one-and-only" function. Additionally, where "Keep both constraints" appears in the "replacement constraint" column of Table 1, there may be no single replacement <Apply> element. For instance, the predicates may be compatible, but not combinable. In such a case, in the intersection the original <Apply> elements may not be modified. Where "any-constraint( )" appears in Table 1, it may be evaluated as "true" if there is a policy constraint in the policy set that applies to a vocabulary item in the "any-constraint" reference. A reference to no-constraint(a) may be evaluated as "true" if there is no policy constraint in the policy set that applies to vocabulary item a. Please note that in Table 1, the symbol "∩" refers to set intersection and the symbol "⊆" refers to a proper subset.

TABLE 1

| first constraint | second constraint | compatibility test | replacement constraint |
|---|---|---|---|
| type-equal(a, b) | type-equal(a, c) | b == c | type-equal(a, b) |
| type-equal(a, b) | type-greater-than(a, c) | b > c | type-equal(a, b) |
| type-equal(a, b) | type-greater-than-or-equal(a, c) | b ≧ c | type-equal(a, b) |
| type-equal(a, b) | type-less-than(a, c) | b < c | type-equal(a, b) |
| type-equal(a, b) | type-less-than-or-equal(a, c) | b ≦ c | type-equal(a, b) |
| type-greater-than(a, b) | type-greater-than(a, c) | | type-greater-than(a, max(b, c)) |
| type-greater-than(a, b) | type-greater-than-or-equal(a, c) | | For b ≧ c  type-greater-than(a, b) <br> For b < c  type-greater-than-or-equal(a, c) |
| type-greater-than-or-equal(a, b) | type-greater-than-or-equal(a, c) | | type-greater-than-or-equal(a, max(b, c)) |
| type-less-than(a, b) | type-less-than(a, c) | | type-less-than(a, min(b, c)) |
| type-less-than(a, b) | type-less-than-or-equal(a, c) | | Where b > c  type-less-than-or-equal(a, c) <br> Where b ≦ c  type-less-than(a, b) |
| type-less-than-or-equal(a, b) | type-less-than-or-equal(a, c) | | type-less-than-or-equal(a, min(b, c)) |
| type-greater-than(a, b) | type-less-than(a, c) | b < c | Keep both constraints |
| type-greater-than(a, b) | type-less-than-or-equal(a, c) | b < c | Keep both constraints |
| type-greater-than-or-equal(a, b) | type-less-than(a, c) | b < c | Keep both constraints |
| type-greater-than-or-equal(a, b) | type--less-than-or-equal(a, c) | b < c | Keep both constraints |
| set-equals(a, b) | set-equals(a, c) | b == c | set-equals(a, b) |
| set-equals(a, b) | subset(a, c) | b ⊆ c | set-equals(a, b) |
| subset(a, b) | subset(a, c) | ∩ (b, c) ≠ 0 | subset (a, ∩ (b, c)) |
| must-be-present(a) | Any constraint other than must-not-be-present(a) | | The second constraint |
| must-not-be-present(a) | must-not-be-present(a) | | must-not-be-present(a) |
| any-constraint(a) | no constraint(a) | | any-constraint(a) |
| time-in-range(a, b, c) | time-equal(a, d) | b ≦ d ≦ c | time-equal(a, d) |
| time-in-range(a, b, c) | time-greater-than-or-equal(a, d) | b ≦ d ≦ c | time-in-range(a, d, c) |
| time-in-range(a, b, c) | time-less-than-or-equal(a, d) | b ≦ d ≦ c | time-in-range(a, b, d) |
| type-regexp-match (a, b) | type-equal(c, b) | ∩ (a, c) ≠ 0 | type-equal(c, b) |
| type-regexp-match (a, b) | Type-regexp-match(c, b) | ∩ (a, c) ≠ 0 | type-regexp-match(∩ (a, c), b) |

Referring to Table 1 above, and according to some embodiments, if two policy constraints in the same policy set constrain the same vocabulary item, the two policy constraints may be referred to as coincident. Further, if two policy constraints in the same policy set are not coincident, their intersection may be the two original policy constraints, in one embodiment. Additionally, if two coincident policy constraints are not compatible according to the "compatibility test" column of Table 1, the two policy constraints may be incompatible and any policy set containing them may need to be discarded from its parent policy. Furthermore, if two coincident policy constraints are compatible, such as indicated by the "compatibility test" column of Table 1, the intersection of two policy constraints may be the result specified in the "replacement constraint" column of Table 1, according to certain embodiments.

Figure 12:
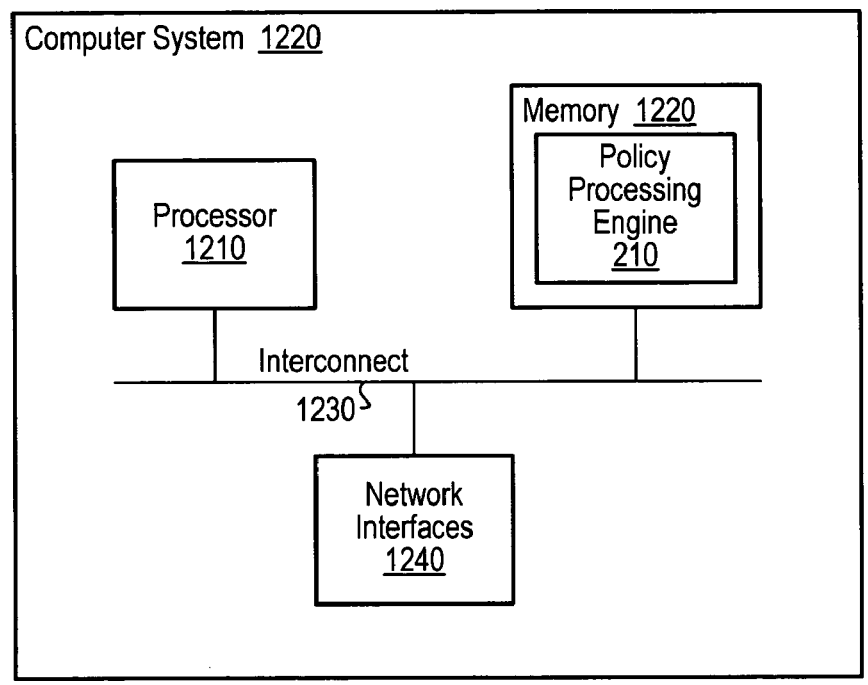
FIG. 12 is a block diagram illustrating an exemplary computer system suitable for implementing policy constraint processing, according to one embodiment.

FIG. 12 is a block diagram illustrating an embodiment of a computer system usable to implement policy constraint matching, as described herein. In one embodiment, participants in web services, such as consumer 110, provider 120, and/or service broker 200, illustrated in FIG. 2, may include a general-purpose computer system that includes or is configured to access one or more computer-accessible media, such as computer system 1200 illustrated in FIG. 12. In the illustrated embodiment, computer system 1100 may include one or more processors 1210 coupled to a memory 1220 via an input/output (I/O) interconnect 1230. Computer system 1200 may further include one or more network interfaces 1240 coupled to interconnect 1230.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store instructions and data accessible by process 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for policy constraint matching, are shown stored within system memory 1220.

In one embodiment, I/O interface 1230 may be configured to coordinate I/O traffic between processor 1210, system memory 1220, and any peripheral devices in the device, including network interface(s) 1240 or other peripheral interfaces. In some embodiments, I/O interconnect 1230 may perform any necessary protocol, timing or other data transformations to convert data signals from one component (e.g., system memory 1220) into a format suitable for use by another component (e.g., processor 1210). In some embodiments, I/O interconnect 1230 may include support for devices attached through various types of peripheral buses, such as a variant of the Peripheral Component Interconnect (PCI) bus standard or the Universal Serial Bus (USB) standard, for example. In some embodiments, the function of I/O interconnect 1230 may be split into two or more separate components, such as a north bridge and a south bridge, for example. Also, in some embodiments some or all of the functionality of I/O interconnect 1230, such as an interface to system memory 1220, may be incorporated directly into processor 1210.

Network interface(s) 1240 may be configured to allow data to be exchanged between computer system 1200 and other devices attached to a network, such as other computer systems, for example. Network interface 1240 may commonly support one or more wireless networking protocols (e.g., Wi-Fi/IEEE 802.11, or another wireless networking standard). However, in various embodiments, network interface 1240 may support communication via any suitable wired or wireless general data networks, such as other types of Ethernet network, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 1200 via I/O interface 1230. A computer readable storage medium may also include any volatile or non-volatile media such as RAM (e.g. SDRAM, DDR SDRAM, RDRAM, SRAM, etc.), ROM, etc, that may be included in some embodiments of computer system 1200 as system memory 1220 or another type of memory. Further, a computer-accessible medium may store program instructions capable of being transmitted across transmission media or signals such as electrical, electromagnetic, or digital signals, conveyed via a communication medium such as network 100, another network, and/or a wireless link, such as may be implemented via network interface(s) 1240.

Network 100, as illustrated in FIG. 2, may comprise any of various network technologies according to various embodiments. Network 100 may be a local area network, wide area network, intranet network, Internet network, or many other types of network. Network 100 may be designed to be continuously available (although network outages may occur), or may be intermittent (e.g. a modem connection made between a computer system in a user's home and a computer system in a user's workplace). Network 100 may utilize any of a number of different physical networking technologies including, but not limited to, Fiber Channel, Ethernet, Fast-Ethernet, Gigabit-Ethernet, Myrinet, Infiniband, VAX CI, or ServerNet, or others. Network 100 may be configured according to a number of different network topologies including, but not limited to, star, token-ring, token-bus, scatternet, dual-ring, mesh, etc. Network 100 may also be configured to utilize a combination of different networking technologies and/or topologies. Additionally, Network 100 may comprise shared storage or shared memory for communicating between different computer systems or between processes within the same computer system, according to some embodiments.

The various methods as illustrated in the figures and described herein represent exemplary embodiments of methods. The methods may be implemented in software, hardware, or a combination thereof. The order of method may be changed, and various elements may be added, reordered, combined, omitted, modified, renamed, etc. Thus, various modifications and changes may be made as would be obvious to a person skilled in the art having the benefit of this disclo-

What is claimed is:

1. A method, comprising:

accessing a first policy definition comprising one or more policy constraints, wherein each policy constraint specifies one or more acceptable values for each of one or more vocabulary items of the first policy definition;

accessing a second policy definition comprising one or more other policy constraints, each of which specifies one or more acceptable values for one or more other vocabulary items of the second policy definition;

wherein one of the acceptable values of the first policy definition and of the acceptable values of the second policy definition for a single vocabulary item common to both the first and second policy definitions are configured in a hierarchical relationship, wherein a narrower one of the acceptable values for the common vocabulary item is defined as a subset of a broader one of the acceptable values for the common vocabulary item;

wherein the narrower one of the acceptable values inherits all semantics from the broader acceptable value;

determining an intersection policy definition comprising one or more intersection policy constraints specifying one or more acceptable values for the vocabulary item common to both the first and second policy definitions, wherein said determining comprises specifying the narrower one of the acceptable values in one of the one or more intersection policy constraints for the common vocabulary item; and communicating with a device in a distributed computing environment according to the determined intersection policy definition.

2. The method of claim 1, wherein said determining comprises:

comparing the one or more acceptable values for each of the one or more vocabulary items of the first policy definition to the one or more acceptable values for each of the one or more vocabulary items of the second policy definition to determine the one or more intersection values for each of the one or more vocabulary items common to both the first and second policy definitions; and generating the one or more intersection policy constraints, wherein said generating comprises determining one or more acceptable policy constraints, wherein each of the acceptable policy constraints specifies one or more acceptable values for the one or more vocabulary items common to both the first and second policy definitions.

3. The method of claim 2, wherein said determining one or more acceptable policy constraints comprises identifying one or more policy constraints of either the first or the second policy definition that include acceptable values for vocabulary items common to both the first and the second policy definition.

4. The method of claim 2, wherein said determining one or more acceptable policy constraints comprises determining intersections of one or more policy constraints of the first policy definition and a corresponding one or more policy constraints of the second policy definition, wherein the intersected policy constraints specify acceptable values for vocabulary items common to both policy definitions.

5. The method of claim 2, wherein said determining further comprises analyzing the one or more generated intersection policy constraints and the one or more intersection values to determine one or more inconsistent ones of the intersection policy constraints, wherein each of the one or more inconsistent ones of the intersection policy constraints comprises one or more values which conflict with one or more other values for the same vocabulary item.

6. The method of claim 1, wherein one of the policy constraints for the first policy definition and one of the policy constraints for the second policy definition each specifies a preference order for one or more acceptable values for one of the one or more vocabulary items common to both the first policy definition and the second policy definition; and wherein said determining comprises determining a preference order for one or more acceptable values for the common vocabulary item based on the preference orders by the policy constraints for the first and second policy definition.

7. The method of claim 1, wherein the first policy definition specifies a preference order for the one or more policy constraints of the first policy definition, and wherein said determining comprises determining a preference order for the one or more policy constraints for the intersection policy definition based on the preference order specified by the first policy definition.

8. The method of claim 1, further comprising translating the set of vocabulary items referenced by the first or second policy to a different vocabulary item syntax prior to accessing the first or second policy, respectively.

9. The method of claim 8, wherein the one or more transformation definitions comprise Extensible Stylesheet Language Transformations (XSLT).

10. The method of claim 8, wherein the one or more transformation definitions comprise XML Path Language (XPATH).

11. The method of claim 1, wherein the one or more policy constraints of the first policy definition and the one or more policy constraints of the second policy definition are defined using a policy constraints language.

12. The method of claim 11, wherein the policy constraints language comprises the WS-PolicyConstraints language.

13. The method of claim 1, wherein the first policy definition further comprises one or more policy sets each comprising one or more of the one or more policy constraints of the first policy definition, wherein each of the one or more policy sets is specified in a policy definition language, wherein the one or more policy constraints comprise a policy constraints language different from the policy definition language.

14. The method of claim 1, wherein said accessing the first policy definition comprises receiving the first policy definition from a service provider in a distributed computing environment, wherein the first policy definition includes information specifying one or more service interfaces for the service provider; and wherein said accessing the second policy definition comprises receiving the second policy definition from a consumer in the distributed computing environment, wherein the second policy definition includes information specifying one or more interfaces the consumer is capable of using.

15. The method of claim 14, wherein the first policy definition and the second policy definition define web services policies for communicating in the distributed computing environment.

16. The method of claim 14, wherein a service broker in the distributed computing environment performs said accessing a first policy definition, said accessing a second policy definition, and said determining in response to said receiving the first policy definition and receiving the second policy definition.

17. The method of claim 14, wherein a policy-processing engine for the consumer performs said accessing a first policy definition, said accessing a second policy definition, and said determining.

18. The method of claim 14, further comprising sending the intersection policy definition to the consumer.

19. The method of claim 18, further comprising the consumer validating the intersection policy definition against the second policy definition, wherein said validating comprises comparing each of one or more of the specifications for acceptable values specified by the intersection policy definition to one or more of the specifications for acceptable values specified by the second policy definition for the vocabulary item common to both the intersection policy definition and the second policy definition to identify one or more specifications for acceptable values in the intersection policy definition that conflict with one or more of the compared specifications for acceptable values of the second policy definition.

20. The method of claim 18, further comprising the consumer initiating communication with the service provider according to the intersection policy definition, wherein said initiating communication comprises the consumer sending the intersection policy definition to the service provider as part of initiating communication with the service provider.

21. The method of claim 20, further comprising:
the consumer sending a message generated in accordance with the intersection policy definition, wherein the message comprises one or more vocabulary items and one or more values for each of the vocabulary items, wherein the one or more vocabulary items match one of the sets of vocabulary items specified by the intersection policy definition; and
the service provider, in response to receiving the message, verifying that each of the one or more values for each of the one or more vocabulary items in the message matches one or more of the acceptable values for the respective vocabulary item specified by the intersection policy definition.

22. A device, comprising:
a processor; and
a memory coupled to the processor, wherein the memory comprises program instructions configured to:
access a first policy definition comprising one or more policy constraints, wherein each policy constraint specifies one or more acceptable values for each of one or more vocabulary items of the first policy definition;
access a second policy definition comprising one or more other policy constraints, each of which specifies one or more acceptable values for one or more other vocabulary items of the second policy definition;
wherein one of the acceptable values of the first policy definition and of the acceptable values of the second policy definition for a single vocabulary item common to both the first and second policy definitions are configured in a hierarchical relationship, wherein a narrower one of the acceptable values for the common vocabulary item is defined as a subset of a broader one of the acceptable values for the common vocabulary item;
wherein the narrower one of the acceptable values inherits all semantics from the broader acceptable value;
determine an intersection policy definition comprising one or more intersection policy constraints specifying one or more acceptable values for each of one or more vocabulary items common to both the first and second policy definitions, wherein said determining comprises specifying the narrower one of the acceptable values in one of the one or more intersection policy constraints for the common vocabulary item; and
communicate with a device in a distributed computing environment according to the determined intersection policy definition.

23. A computer readable storage medium, comprising program instructions configured to implement:
accessing a first policy definition comprising one or more policy constraints, wherein each policy constraint specifies one or more acceptable values for each of one or more vocabulary items of the first policy definition;
accessing a second policy definition comprising one or more other policy constraints, each of which specifies one or more acceptable values for one or more other vocabulary items of the second policy definition;
wherein one of the acceptable values of the first policy definition and of the acceptable values of the second policy definition for a single vocabulary item common to both the first and second policy definitions are configured in a hierarchical relationship, wherein a narrower one of the acceptable values for the common vocabulary item is defined as a subset of a broader one of the acceptable values for the common vocabulary item;
wherein the narrower one of the acceptable values inherits all semantics from the broader acceptable value;
determining an intersection policy definition comprising one or more intersection policy constraints specifying one or more acceptable values for each of one or more vocabulary items common to both the first and second policy definitions, wherein said determining comprises specifying the narrower one of the acceptable values in one of the one or more intersection policy constraints for the common vocabulary item; and
communicating with a device in a distributed computing environment according to the determined intersection policy definition.

* * * * *